US009423255B2

(12) United States Patent
Jirapong et al.

(10) Patent No.: US 9,423,255 B2
(45) Date of Patent: Aug. 23, 2016

(54) SYSTEM AND METHOD FOR MITIGATING AN OCCURRENCE OF A DRY SPOT IN A FIELD OF VIEW OF A STAR TRACKER

(71) Applicant: The Boeing Company, Chicago, IL (US)

(72) Inventors: Ryan Jirapong, Los Angeles, CA (US); David D. Needelman, Torrance, CA (US); Bradley W. Taylor, Lawndale, CA (US); Patrick J. Moran, Playa Del Ray, CA (US); Michael G. Novean, Valencia, CA (US)

(73) Assignee: The Boeing Company, Chicago, IL (US)

( * ) Notice: Subject to any disclaimer, the term of this patent is extended or adjusted under 35 U.S.C. 154(b) by 405 days.

(21) Appl. No.: 14/309,324

(22) Filed: Jun. 19, 2014

(65) Prior Publication Data
US 2015/0369607 A1 Dec. 24, 2015

(51) Int. Cl.
| | | |
|---|---|---|
| *G01C 25/00* | (2006.01) | |
| *B64G 1/24* | (2006.01) | |
| *G01C 21/02* | (2006.01) | |
| *G06F 17/30* | (2006.01) | |
| *B64G 1/36* | (2006.01) | |

(52) U.S. Cl.
CPC ............ *G01C 21/025* (2013.01); *B64G 1/361* (2013.01); *G01C 25/00* (2013.01); *G06F 17/30241* (2013.01); *B64G 2001/245* (2013.01)

(58) Field of Classification Search
CPC ........ B64G 1/361; B64G 1/286; B64G 1/24; G01S 3/7867; G01C 25/00; G05D 1/0883
USPC .......... 701/13, 513, 4; 73/862.041; 348/144; 244/171; 250/203.1, 206.1
See application file for complete search history.

(56) References Cited

U.S. PATENT DOCUMENTS

| | | | | |
|---|---|---|---|---|
| 5,508,932 A | * | 4/1996 | Achkar | ................... B64G 1/24 244/164 |
| 6,102,338 A | * | 8/2000 | Yoshikawa | .............. B64G 1/24 244/171 |
| 6,362,464 B1 | * | 3/2002 | Liu | ........................ B64G 1/361 244/171 |
| 6,478,260 B1 | | 11/2002 | Rice et al. | |
| 7,136,752 B2 | | 11/2006 | Needelman et al. | |
| 7,219,014 B2 | | 5/2007 | Needelman et al. | |
| 7,228,231 B2 | * | 6/2007 | Needelman | ............ B64G 1/361 244/158.4 |
| 7,310,578 B2 | | 12/2007 | Alstad et al. | |
| 2005/0161580 A1 | * | 7/2005 | Sebbag | ................ G05D 1/0883 250/203.1 |
| 2013/0125667 A1 | * | 5/2013 | Fitz-Coy | ................ B64G 1/286 73/862.041 |
| 2015/0219744 A1 | * | 8/2015 | Eikenberry | ............. G01S 5/163 348/144 |

OTHER PUBLICATIONS

Fowell et al., "Bad Stars," *Advances in the Astronautical Sciences*, vol. 133, American Astronautical Society (2009).

* cited by examiner

*Primary Examiner* — Yuri Kan
(74) *Attorney, Agent, or Firm* — Walters & Wasylyna LLC

(57) ABSTRACT

A system and method for mitigating an occurrence of a dry spot, the method may include: (1) predicting the occurrence of the dry spot by at least one of determining a location of the occurrence of the dry spot, determining a date of the occurrence of the dry spot, and determining a duration of the occurrence of the dry spot; (2) generating a visualization of the occurrence of the dry spot, and (3) modifying a star catalog to reduce an impact of the dry spot by at least one of generating a set of modification to modify the star catalog, generating a modification schedule for modifying the star catalog, and uploading the set of modifications to the star catalog.

24 Claims, 13 Drawing Sheets

SYSTEM AND METHOD FOR MITIGATING AN OCCURRENCE OF A DRY SPOT IN A FIELD OF VIEW OF A STAR TRACKER

FIELD

The present disclosure is generally related to star trackers and, more particularly, to a system and method for mitigating an occurrence of less than a minimum number of stars being identified by a star tracker (i.e., a dry spot in a field of view of the star tracker) by modifying a star catalog.

BACKGROUND

Aerospace vehicles are used for a variety of different purposes. For example, aircraft (e.g., both manned and unmanned), spacecraft (e.g., both manned and unmanned), unmanned aerial vehicles ("UAV") and satellites are in widespread use for various purposes including communications, scientific research and other civil and military applications. However, many aerial missions may not be accurately fulfilled without consistently monitoring and controlling a 3-axis attitude of the vehicle.

Attitude may be described as the vehicle orientation with respect to some external reference frame. In many applications, the vehicle must be oriented to transmit signals in particular directions and/or to receive signals from specifically located sources. Without accurate control over the vehicle 3-axis attitude, the transmission and/or reception of such signals may be hindered and, at times, may be impossible.

Such control may require systems for 3-axis attitude, which generally include one or more star trackers. During normal operation, star trackers may provide attitude-related information. As there may be inherent, and time-varying, errors from star trackers, it may be necessary to constantly estimate such errors, in order to compensate for them. One method of doing so is to identify stars tracked by the star tracker and correlate the star tracker position measurements of the stars with known positions of the same stars, as listed in an onboard star catalog.

When a star tracker is pointed at a region in the sky where the attitude determination system cannot identify a minimum number of stars for a predetermined period of time, the vehicle attitude may be properly maintained and/or a vehicle fault may occur. Such a region may be defined to be a "dry spot".

When the star tracker cannot identify a minimum number of stars for a predetermined period of time, a dry spot may occur and the vehicle attitude may not be properly maintained and/or a vehicle fault may occur.

Accordingly, those skilled in the art continue with research and development efforts in the field of star trackers to minimize or eliminate the occurrences of less than a minimum number of stars being identified by a star tracker.

SUMMARY

In one embodiment, the disclosed method for mitigating an occurrence of a dry spot may include the steps of: (1) predicting the occurrence of the dry spot, and (2) modifying a star catalog to reduce an impact of the dry spot.

In one embodiment, the disclosed method may include the step of: generating a visualization of the occurrence of the dry spot.

In one embodiment, the disclosed method may include at least one of the steps of: (1) determining a location of the occurrence of the dry spot, (2) determining a date of the occurrence of the dry spot, and/or (3) determining a duration of the occurrence of the dry spot.

In one embodiment, the disclosed method may include at least one of the steps of: (1) generating a set of modification to modify the star catalog, (2) generating a modification schedule for modifying the star catalog, and/or (3) uploading the set of modifications to the star catalog.

In one embodiment, the disclosed system for mitigating an occurrence of a dry spot may include: at least one computing device, and a non-transitory medium storing instructions that, when executed by the at least one computing device, causes the at least one computing device to: (1) predict the occurrence of the dry spot, and (2) modify a star catalog to reduce an impact of the dry spot.

Other embodiments of the disclosed system and method for mitigating an occurrence of a dry spot will become apparent from the following detailed description, the accompanying drawings and the appended claims.

DETAILED DESCRIPTION

Figure 1:
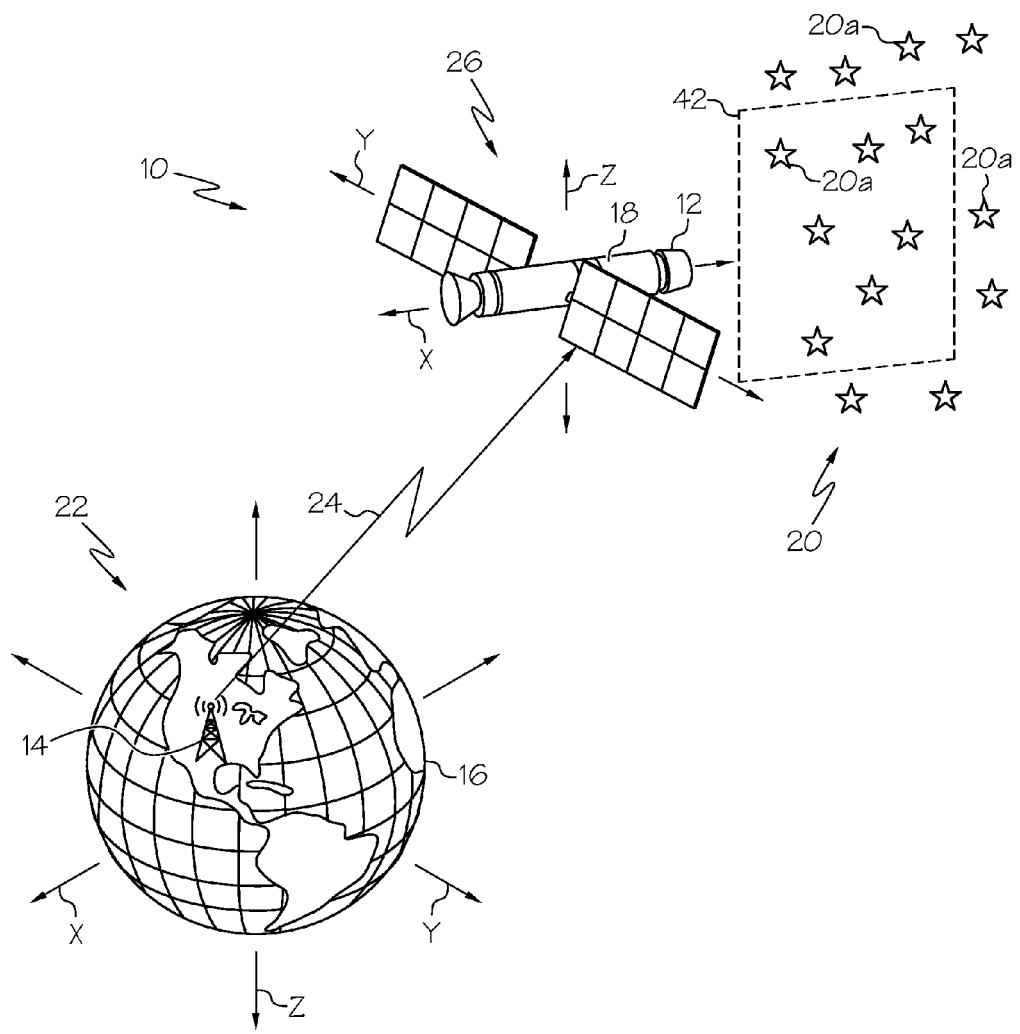
FIG. 1 is a schematic perspective view of one embodiment of a system for determining stars in a field of view of a star tracker.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Referring generally to FIGS. 1-18, disclosed is a system 116 and method 200 for mitigating an occurrence of a dry spot, generally designated 38, in a field of view 42 of a star tracker 28. As used herein, the term "dry spot" may define a location (e.g., in the sky) where less than the minimum number of identified stars 52 are present within the field of view 42 of the star tracker 28 for a period of time 136 (e.g., between at a given pair of attitudes 134 of an attitude history of the vehicle 12). As one example, and as will be described in more detail herein below, the dry spot 38 may include any location where a minimum number of star entries 50a in a star catalog 34 do not correspond to a plurality of tracked stars 90 tracked by the star tracker 28 (e.g., within the field of view 42 of the star tracker 28) between the pair of attitudes 134 of the vehicle 12 (e.g., are not identified stars 52a).

Referring to FIG. 1, one embodiment of the disclosed system, generally designated 10, for determining stars in a field of view of a star tracker field of a vehicle may include one or more vehicles 12 (only one vehicle 12 is illustrated in FIG. 1). The system 10 may be in communication (e.g., transmitting signals 24 to and/or receiving signals 24 from), for example, with a station 14 on the Earth 16. The vehicle 12 may include an apparatus 18 for determining and/or controlling inertial attitude and/or angular velocity of the vehicle 12 based, in whole or in part, upon measurements of positions of a plurality of stars 20 (designated individually as star 20a).

While the vehicle 12 is illustrated herein, by example, as a satellite, those skilled in the art will recognize that the vehicle 12 may include any vehicle that utilizes a star tracker (or star sensor) to aid in determining the attitude of the vehicle 12 including, but not limited to, aircraft, spacecraft, unmanned aerial vehicles ("UAV") and satellites.

As used herein, attitude 134 may be described as the orientation of the vehicle 12 with respect to a separately defined external frame, for example, an Earth-Centered Inertial ("ECI") coordinate frame 22 of the Earth 16.

The ECI coordinate frame 22 may include a Cartesian coordinate system representing positions as an X, Y, and Z coordinate. For example, an X-axis may be permanently fixed in a direction relative to the Earth 16 (e.g., does not rotate as the Earth rotates). A Y-axis may be normal to the X-axis (e.g., lies at a 90° angle with respect to the X-axis) defining an X-Y plane coinciding with an equatorial plane of the Earth 16. A Z-axis may be normal to both the X-axis and Y-axis (e.g., lies at a 90° angle with respect to the X-Y plane) and extends through the North Pole. Those skilled in the art will recognize that due to forces exerted from the sun and moon, the Earth's equatorial plane may move with respect to the celestial sphere. While the Earth 16 may rotate, the ECI coordinate frame 22 may not move.

The vehicle 12 may include a vehicle coordinate frame 26. The vehicle coordinate frame 26 may include a Cartesian coordinate system representing positions as an X, Y, and Z coordinate. The vehicle coordinate frame 26 may be arbitrarily chosen or may be defined relative to the body of the vehicle 12. For example, an X-axis may be fixed in a direction relative to the vehicle 12. A Y-axis may be normal to the X-axis. A Z-axis may be normal to both the X-axis and Y-axis.

As one example, the Y-axis of the vehicle coordinate frame 26 may be oriented in the same direction as the Y-axis of the ECI coordinate frame 22. Thus, attitude 134 may refer to the angular orientation of the vehicle coordinate frame 26 with respect to the ECI coordinate frame 22.

Figure 2:
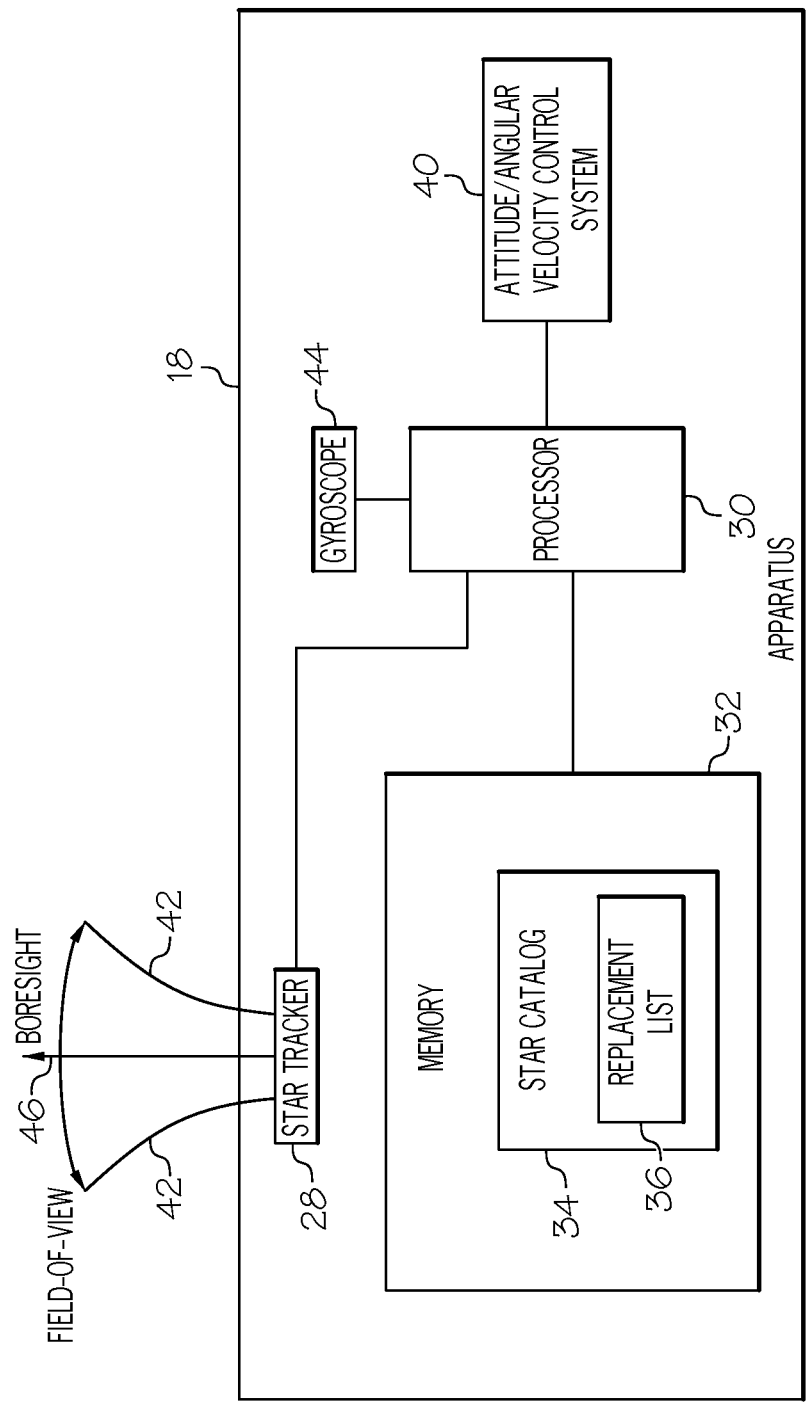
FIG. 2 is a schematic block diagram of one embodiment of an apparatus for controlling the system represented FIG. 1.

Referring to FIG. 2, in one embodiment, the apparatus 18 may locate stars 20a within or near the field of view 42 of the star tracker 28 in order to aid in determining and/or controlling the attitude and/or angular velocity of the vehicle 12. Many scientific and/or communications missions may not be accurately fulfilled without consistently monitoring and controlling the vehicle 3-axis attitude and/or angular velocity. In many applications the vehicle 12 must be oriented to transmit signals 24 in particular directions or to receive signals 24 (FIG. 1) from specifically located sources (e.g., the station 14). Without accurate control over vehicle 3-axis attitude and/or angular velocity, the transmission or reception of such signals 24 may be hindered and at times may be impossible.

The apparatus 18 may include one or more star trackers (or star sensors) 28, one or more gyroscopes 44 (e.g., a 3-axis gyroscope), and/or one or more processors 30. The apparatus 18 may include a memory 32 coupled to the processor 30. The memory 32 may include a star catalog 34, which may be an astronomical database or portion thereof. The apparatus 18 may include an attitude and/or angular velocity control system 40 coupled to the processor 30. Those skilled in the art will recognize that the processor 30 and/or the memory 32 may be physically on the vehicle 12 or may be remotely coupled to the vehicle, for example, from the ground station 14 (FIG. 1).

Figure 3:
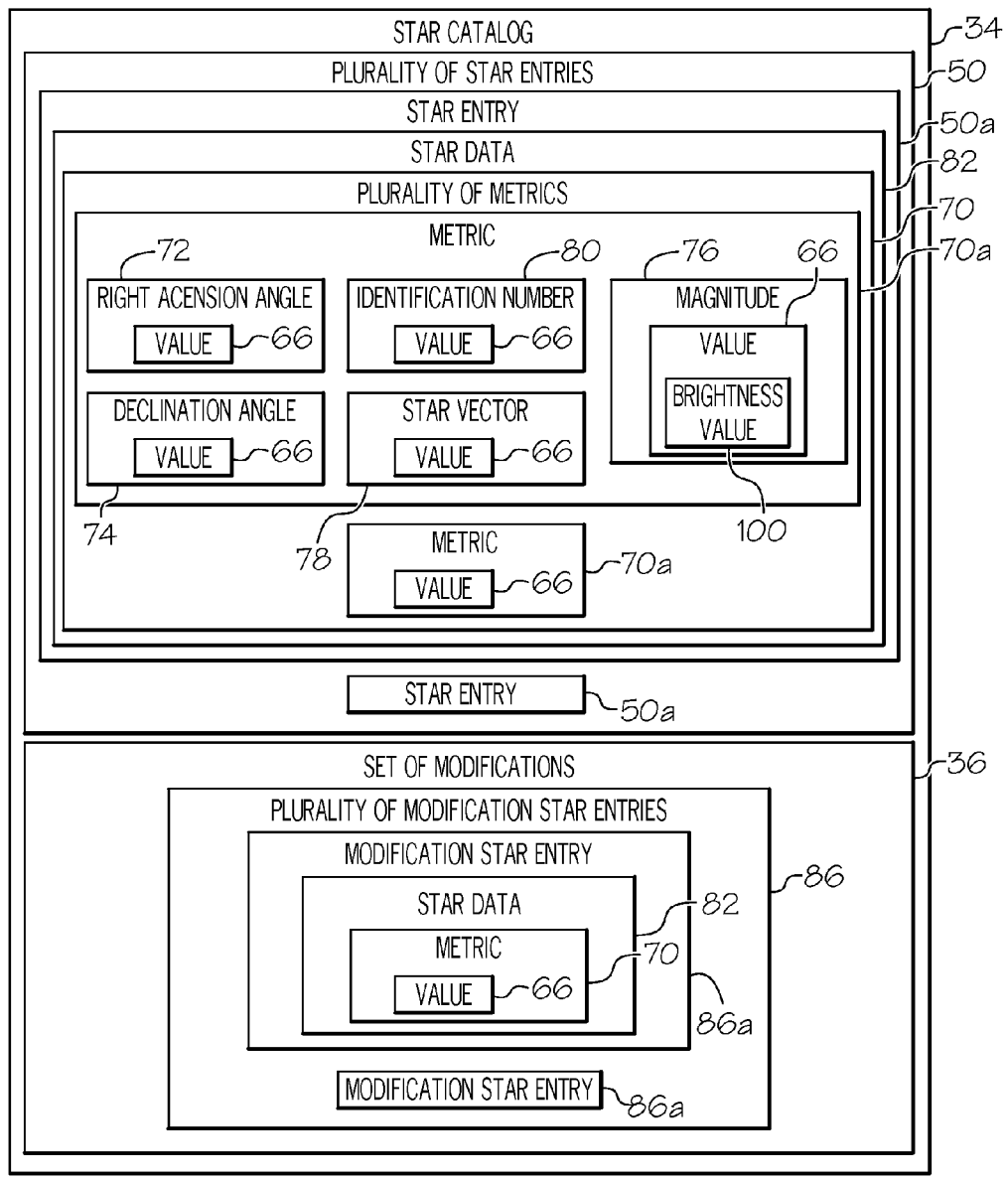
FIG. 3 is a block diagram of one embodiment of the star catalog represented in FIG. 2.

Referring to FIG. 3, in one embodiment, the star catalog 34 may be a database including a plurality of star entries 50 (designated individually as star entry 50a). Each star entry 50a of the plurality of star entries 50 may correspond to a particular star 20a of the plurality of stars 20. Those skilled in the art will recognize that the plurality of star entries 50 contained by the star catalog 34 may be limited to a predetermined number of star entries 50a. As one example, the stars entries 50a selected for inclusion in the star catalog 34 may be limited due to inherent size limitations of the star catalog 34 and/or the memory 30. As one example, the star entries 50a selected for inclusion in the star catalog 34 may be limited to star entries 50a corresponding only to stars 20a having desirable properties. Stars 20a having undesirable (e.g., exclusionary) properties may be excluded from inclusion into the star catalog 34. For example, undesirable properties may include, but are not limited to: if a star 20a moves with respect to a celestial sphere at a relatively high rate (e.g., the position of the star 20a changes fast enough to potentially cause problems with attitude determination); if the star 20a (e.g., target star) has a near neighbor (e.g., another star 20a that is nearby or appears nearby when viewed from Earth) that may be mistaken for the target star; if the star 20a has a magnitude that varies widely over time, making the star 20a difficult to identify; and the like. Thus, every star 20a of the plurality of stars 20 in the sky may not be represented by a star entry 50a in the star catalog 34.

In one example implementation, the plurality of star entries 50 contained in the star catalog 34 may be selected from a main star database 88 (FIG. 8), which may be an astronomical database or portion thereof. The main star database 88 may include a plurality of star entries 50 corresponding to the plurality of stars 20 (e.g., to known stars 20*a*). The plurality of star entries 50 selected from the main star database 88 for inclusion in the star catalog 34 may represent the stars 20*a* of the plurality of stars 20 that are predicted to be (e.g., most likely to be) tracked by the star tracker 28 at a given attitude 134.

Each star entry 50*a* may include star data 82. The star data 82 may include a plurality of metrics 70 (designated individually at metric 70*a*) corresponding to the plurality of stars 20. Each metric 70*a* may correspond to a particular star 20*a* of the plurality of stars 20. Each metric 70*a* may include a value 66. As one example, the plurality of metrics 70 may include at least one of: a right ascension angle 72 of the star 20*a* in a given ECI coordinate frame 22, a declination angle 74 of the star 20*a* in the given ECI coordinate frame 22, a magnitude 76 of the star 20*a*, a star vector 78, an identification number 80 of the star 20*a*, and/or other metrics 70*a* (e.g., properties) of the star 20*a*.

In one example implementation, the plurality of star entries 50 may be sorted by the star data 82 (e.g., by one or more metrics 70*a* of the plurality of metrics 70*a*). As one example, the star data 82 may be stored using a primary and multiple secondary arrays. As one example, the star data 82 may be sorted by at least one of the declination angle 74 and/or the right ascension angle 72. As one example, each primary array element may point to separate secondary arrays, which may contain star data 82 (e.g., magnitude 76, star vector 78, and/or identification number 80) for all the stars 20*a* that are between the current and the primary array next element. As one example, the stars 20*a* in the primary array may be sorted by declination angles 74 ranging, for example, from negative ninety to positive ninety degrees. As one example, the stars 20*a* in the secondary arrays may be sorted by their right ascension, for example, from zero to three hundred-sixty degrees.

Referring to FIGS. 1 and 2, in one embodiment, the star tracker 28 may be mounted to the vehicle 12. The star tracker 28 may include a field of view ("FOV") 42 and a boresight 46 centered in the field of view 42. The star tracker 28 may be coupled to the processor 30. The star tracker 28 may locate a plurality of stars 20 (e.g., sense a position of one or more stars 20*a*) within or near the field of view 42 of the star tracker 28 in order to aid in controlling the attitude of the vehicle 12. As one example, the plurality of stars 20 within or near the field of view 42 may be defined by the stars 20*a* located within a frame defined by the field of view 42 of the star tracker 28 with respect to the vehicle 12 (e.g. to the vehicle coordinate frame 26). The star tracker 28 may generate a plurality of signals corresponding to the plurality of positions of the plurality of stars 20 in the field of view 28. The plurality of signals may include position measurement data for the plurality of stars 20. The star tracker 28 may transmit the signals (e.g., position measurement data) to the processor 30 in a conventional manner.

The processor 30 may receive the plurality of signals corresponding to the plurality of positions (e.g., locations) of the plurality of stars 20 within the field of view 42 of the star tracker 28. The processor 30 may provide control logic operative to select at least one signal of the plurality of signals corresponding to the position (e.g., location) of one or more stars 20*a* of the plurality of stars 20.

For simplification purposes, the processor 30 is illustrated as a single component; however, the processor 30 may be an individual processor or may include of a plurality of processors. For example, each star tracker 28 may include its own processor 30. Similarly, the gyroscope 44 and/or the attitude and/or angular velocity control system 40 may include its own processor 30, for example, a spacecraft control processor ("SCP"). As one example, each processor 30 may be microprocessor-based.

The memory 32 may include a single element or multiple element memory system. As one example, the memory may include various types of memory elements including, but not limited to, random access memory ("RAM"). Additionally, if the processor 30 is microprocessor-based, the microprocessor may include its own memory therein (not shown).

The processor 30 may be coupled to the attitude and/or angular velocity control system 40. The attitude and/or angular velocity control system 40 may include a plurality of actuators (e.g., thrusters or momentum wheels) utilized in a conventional manner. The attitude and/or angular velocity control system 40 may control the various actuators to orient the vehicle 12 in its desired direction.

In one embodiment, more than one star tracker 22 may be included on a vehicle. As one example, the apparatus 18 may include at least one redundant star tracker 28 and/or at least one redundant processor 30. As one specific, non-limiting example, for a given vehicle 12 that requires two star trackers 28 and one processor 30 for normal operation, the vehicle 12 may include three star trackers 28 (e.g., two primary star trackers and one redundant star tracker) and two processors 30 (e.g., one primary processor and one redundant processor).

Referring still to FIGS. 1 and 2, during normal operation of the vehicle 12, the star tracker 28 may provide attitude-related information to the processor 30 and the gyroscope 44 may provide angular velocity information to the processor 30. As there may be inherent, and time-varying, errors from the star tracker 28 and/or the gyroscope 44, it may be necessary to constantly estimate such errors, in order to compensate for the errors. One example operation or procedure for estimating such errors may include correlating the position measurement data (e.g., from the star tracker 28) of one or more stars 20*a* of the plurality of stars 20 with known positions of the same stars 20*a*, as listed in the star catalog 34. Discrepancies between the measured position and predicted (e.g., known) position of the star 20*a* may allow for direct or indirect estimation of star tracker error and/or gyroscopic error. Determination of such errors may allow for estimation of attitude and/or angular velocity or may allow for refinement of existing estimates.

Furthermore, if there are multiple star trackers 28 onboard the vehicle 12, such correlations may allow for the determination of the alignment of such star trackers 28 with respect to each other. Such determination may yield greater accuracy in future attitude and/or angular velocity estimates.

Operations or procedures for estimating errors from the star tracker 28, such as those described above, may require a method for obtaining a coarse estimate of the attitude of the vehicle 12, where, for example, attitude is considered to be the orientation of the vehicle reference frame 26 with respect to the ECI coordinate frame 22. One example method may generally include two steps, as described below.

The first step of such a method for obtaining a coarse estimate of the attitude of the vehicle 12 may be to identify the stars 20*a* of the plurality of stars 20 detected by the star tracker 28 as known stars from the star catalog 34 (e.g., the star catalog 34 includes star entries 50a corresponding to the stars 20a). Each star entry 50a of the star catalog 34 may contain information (e.g., star data 82) about the particular corresponding star 20a of the plurality of stars 20, such as the position (e.g., location) of the star 20a with respect to the ECI coordinate frame 22. In one example implementation, each star entry 50a may be associated with a star catalog index allowing for location of the star entry 50a (e.g., by the processor 30).

Figure 4:
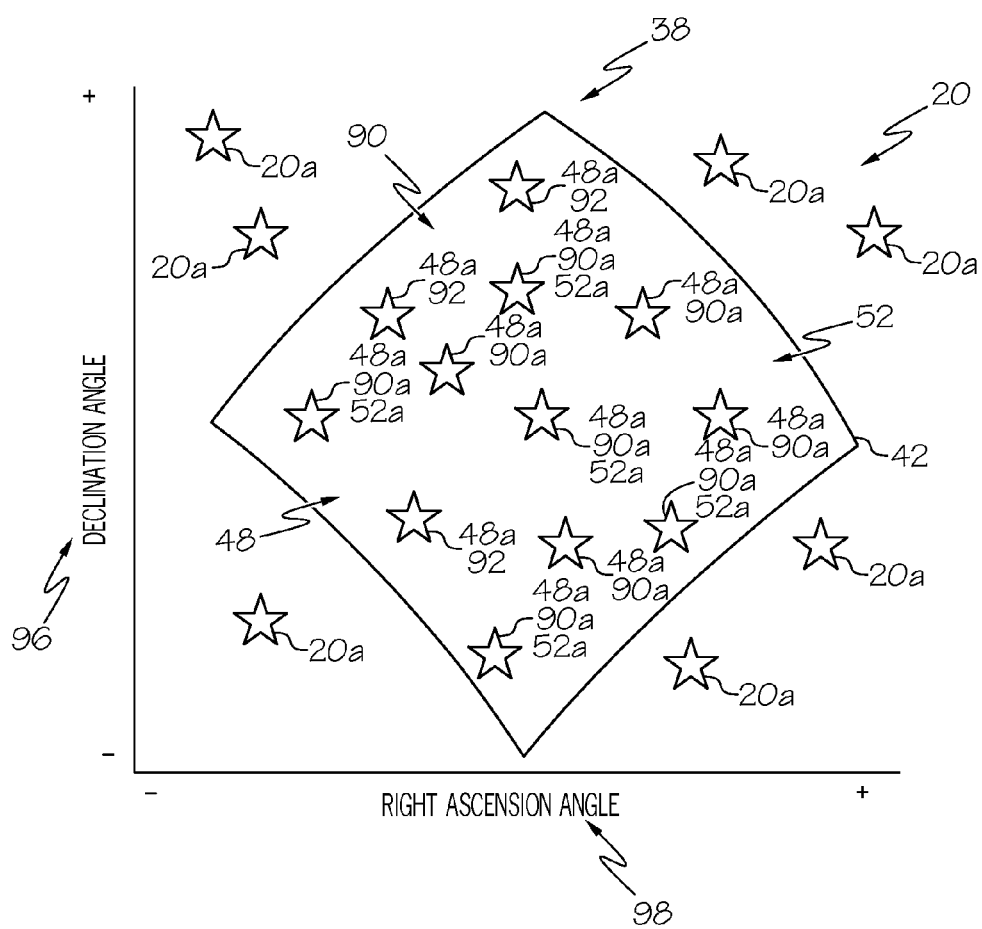
FIG. 4 is a schematic illustration of one embodiment of the field of view represented in FIG. 2.

Referring to FIGS. 2 and 4, as one example, the star tracker 28 may sense and/or detect a plurality of perceived stars 48 (designated individually as perceived star 48a). As used herein, the plurality of perceived stars 48 may include a subset of the plurality of stars 20 (e.g., one or more stars 20a of the plurality of stars 20) that are within the field of view 42 of the vehicle 12 at the given attitude 134 or between the given pair of attitudes 134 of the vehicle 12. In one example implementation, the plurality of star entries 50 selected for inclusion in the star catalog 34 may be a best representation of at least a portion of the plurality of perceived stars 48 predicted to be within the field of view 42 of the vehicle 12 at the given attitude 134 of the vehicle 12.

In one example implementation, in order to find which stars 20a of the plurality of stars 20 are within the field of view 42 (e.g., which stars 20a are perceived stars 48a), a minimum declination angle 96 for the field of view 42 may be calculated from the estimated attitude of the vehicle 12. Starting from a declination strip containing the minimum declination angle 96, a binary search may be performed to find a minimum right ascension angle 98 for the field of view 42. Until the maximum right ascension angle 98 is reached, each star 20a may be determined whether it is within the field of view 42. As one example, determining the plurality of stars 20 within the field of view 42 of the star tracker 28 at the attitude 134 of the plurality of attitudes (e.g., of the attitude history) of the vehicle 12 may include determining a location of the boresight 46 of the star tracker 28 relative to the attitude 134 of the vehicle 12. A limit to the field of view 42 of the star tracker 28 may be determined. A position (e.g., location) of the star 20a of the plurality of stars 20 relative to the field of view 42 may be determined, then whether the position of the star 20a is within the field of view 42 may be determined, and the star 20a may then be designated as a perceived star 48a. This operation may be repeated until all possible declination strips have been searched and all possible perceived stars 48a have been identified and/or designated.

The star tracker 28 may track a plurality of tracked stars 90 (designated individually as tracked star 90a). As used herein, the plurality of tracked stars 90 may include a subset of the plurality of perceived stars 48 (e.g., one or more perceived stars 48a of the plurality of perceived stars 48). The remaining perceived stars 48a of the plurality of perceived stars 48 within the field of view 42 of the star tracker 28 may be untracked stars 92. The star tracker 28 may automatically choose which perceived stars 48a of the plurality of perceived stars 48 to track (e.g., which perceived stars 48a are tracked stars 90a). In one example implementation, the plurality of star entries 50 selected for inclusion in the star catalog 34 may be a best representation of at least a portion of the plurality of tracked stars 90 predicted to be tracked by the star tracker 28 at the given attitude 134 of the vehicle 12.

Those skilled in the art will recognize that the particular number of tracked stars 90a tracked by the star tracker 28 may depend on the type of star tracker 28 being used by the vehicle 12. As one example, at least three perceived stars 48a may be tracked stars 90a. As one example, at least five perceived stars 48a may be tracked stars 90a. As one example, at least eight perceived stars 48a may be tracked stars 90a. As one example, at least ten perceived stars 48a may be tracked stars 90a.

In one example implementation, the plurality of tracked stars 90 may include one or more of the perceived stars 48a having a brightness value 100 (e.g., brightness) sufficiently appreciable for the star tracker 28 to recognize and track. As one example, the plurality of tracked stars 90 may include one or more of the perceived stars 48a having the greatest brightness value 100 (e.g., the brightest) of the plurality of perceived stars 48. Those skilled in the art will recognize that the star tracker 28 may tend to automatically choose and/or track the brightest perceived stars 48a of the plurality of perceived stars 48.

The star tracker 28 and the processor 30 may determine the position (e.g., location) of one or more tracked stars 90a of the plurality of tracked stars 90. As one example, the star tracker 28 may determine the position of one or more tracked stars 90a of the plurality of tracked stars 90 relative to the star tracker 28 (e.g., relative to the vehicle coordinate frame 26). In order to determine the position (e.g., location) of the plurality of tracked stars 90, the star tracker 28 may need to identify one or more of the tracked stars 90a. The plurality of tracked stars 90 that are identified by the star tracker 28 may define a plurality of identified stars 52 (designated individually as identified star 52a). As used herein, the plurality of identified stars 52 may include a subset of the plurality of tracked stars 90 (e.g., one or more tracked stars 90a of the plurality of tracked stars 90) that have corresponding star entries 50a in the star catalog 34.

The second step of such a method for obtaining a coarse estimate of attitude of the vehicle 12 may be to use the following to obtain the estimate of the attitude of the vehicle 12: (1) the knowledge of the position (e.g., location) of the star 20a (e.g., the identified star 52a) with respect to the ECI coordinate frame 22, which may be represented by star data 82 of the star entry 50a in the star catalog 34; (2) the knowledge of the position (e.g., location) of the star 20a (e.g., the identified star 52a) in the field of view 42 of the star tracker 28, which is output by the star tracker 28; and (3) the knowledge of the alignment of the star tracker 28 with respect to the vehicle coordinate frame 26 (e.g. the vehicle body).

In order to properly estimate error and/or aid in maintaining the coarse attitude of the vehicle 12, it may be necessary for a minimum number of identified stars 52a to be present within the field of view 42 of the star tracker 28 at the given attitude and/or between the given pair of attitudes (e.g., the star tracker 28 may need to identify a minimum number of tracked stars 90a corresponding to particular star entries 50a in the star catalog 34). Accordingly, in order to identify the minimum number of identified stars 52a, the star catalog 34 must contain a minimum number of star entries 50a corresponding to the tracked stars 90a (e.g., a minimum number of tracked stars 90a) within the field of view 42 of the star tracker 28.

Those skilled in the art will recognize that the particular minimum number of identified stars 52a required in order to estimate error and/or aid in maintaining the coarse attitude of the vehicle 12 may depend on the type of star tracker 28 being used by the vehicle 12. As one example, at least two identified stars 52a must be present (e.g., a minimum of two star entries 52a must correspond to the plurality of tracked stars 90). As one example, at least three identified stars 52a must be present (e.g., a minimum of three star entries 52a must correspond to the plurality of tracked stars 90). As one example, at least five identified stars 52*a* must be present (e.g., a minimum of five star entries 52*a* must correspond to the plurality of tracked stars 90).

If the minimum number of identified stars 52*a* is not present within the field of view 42 of the star tracker 28 (e.g., if star tracker 28 cannot identify a minimum number of tracked stars 90*a* corresponding to the minimum number of star entries 50*a* in the star catalog 34), a dry spot 38 may occur and the coarse attitude of the vehicle 12 may not be properly maintained, thus, potentially interrupting reception and/or transmission of signals 24 (FIG. 1) and/or causing a fault to occur on the vehicle 12. As one example, if the minimum number of identified stars 52*a* is not present within the field of view 42 of the star tracker 28 for a pre-set period of time 136, a fault may occur. In response to the fault, the vehicle 12 may automatically execute a response; such as, the apparatus 18 may switch from the primary star tracker to the secondary star tracker or the apparatus 18 may switch from the primary processer to the secondary processor.

Those skilled in the art will recognize that the period of time 136 where the minimum number of identified stars 52*a* is not present, the type of fault (e.g., a fault count), and/or the corrective action executed in response to the fault may depend on the type of vehicle 12 (e.g., spacecraft), the type of star tracker 28, and/or the on-board logic of the processor 30.

Generally, the dry spot 38 may occur when the star catalog 34 does not include at least the minimum number of star entries 50*a* corresponding to the plurality of tracked stars 90 within the field of view 42 of the star tracker 28 between the given pair of attitudes 134 (e.g., during the period of time 136). For example, in order to operate normally, the star tracker 28 may require the minimum number of identified stars 52*a* (e.g., at least the minimum number of star entries 52*a* in the star catalog 34 corresponding to the plurality of tracked stars 90).

In one example implementation, the star tracker 28 may track the plurality of tracked stars 90*a*. When the star catalog 34 includes at least the minimum number of star entries 50*a* corresponding to the plurality of tracked stars 90 (e.g., the minimum number of tracked stars 90*a* identified by the star tracker 28 is greater than the minimum number of identified stars 52*a* required), then the star tracker 28 may properly estimate error and/or aid in maintaining the coarse attitude of the vehicle 12. When the star catalog 34 does not includes at least the minimum number of star entries 50*a* corresponding to the plurality of tracked stars 90 (e.g., the minimum number of tracked stars 90*a* identified is less than the minimum number of identified stars 52*a* required), then the star tracker 28 may not properly estimate error and/or aid in maintaining the coarse attitude of the vehicle 12.

Those skilled in the art will recognize that various factors may tend to lead to the occurrence of one or more dry spots 38 between the given pair of attitudes 134 of the vehicle 12 (i.e., where less than the minimum number of identified stars 52*a* are present within the field of view 42 for the period of time 136).

As one example, the star tracker 28 may not distinguish between those tracked stars 90*a* having a corresponding star entry 50*a* in the star catalog 34 (e.g., the tracked stars 90*a* that are identified stars 52*a*) and those tracked stars 90*a* not having a corresponding star entry 50*a* in the star catalog 34 (e.g., the tracked stars 90*a* that are unidentified stars). Thus, a portion of the plurality of tracked stars 90 tracked by the star tracker 28 may not have corresponding star entries 50*a*, which may lead to less than the minimum number of tracked stars 90*a* being identified and creating the occurrence of the dry spot 38.

As one example, the plurality of star entries 50 selected for inclusion in the star catalog 34 as the best representation of the predicted plurality of tracked stars 90 may not represent the actual plurality of tracked stars 90 tracked by the star tracker 28 at the given attitude 134 and/or between the given pair of attitudes 134. For example, a star entry 50*a* may be selected from the main star database 88 (e.g., for inclusion into the star catalog 34) based on a known (e.g., reported) magnitude (e.g., brightness value) of the star 20*a*. As one example, the selected star entry 50*a* may be chosen as one of the brightest perceived star 48*a* within the field of view 42 of the star tracker 28 and, thus, likely to be a tracked star 90*a*. However, the magnitude of the perceived star 48*a* may vary or change over time and/or the reported magnitude of the perceived star 48*a* may be incorrect. As one example, the observed magnitude (e.g., brightness value) of the perceived star 48*a* may be less than another local perceived star 48*a* (e.g., a near neighbor) within the field of view 42 and, thus, the star tracker 28 may track the brighter perceived star 48*a* (e.g., tracked star 90*a*), which may not have a corresponding star entry 50*a* (e.g., is not an identified star 52*a*) and which may lead to less than the minimum number of star entries 52*a* corresponding to the plurality of tracked stars 90 and creating the occurrence of the dry spot 38.

As one example, the star tracker 28 may lose a tracked star 90*a* at any time, for example, due to a proton hit. When the star tracker 28 tracks less a minimum number of tracked stars 90*a* (e.g., as determined by the star tracker 28), it may resume tracking a previously untracked star 92. For example, this may be due to the star tracker 28 choosing an available perceived star 48*a* within the field of view 42 having the greatest brightness value. However, the newly tracked star 90*a* (i.e., the previously untracked star 92) may not have a corresponding star entry 64 contained in the star catalog 34 (e.g., is not an identified star 52*a*), which may lead to less the minimum number of star entries 52*a* corresponding to the plurality of tracked stars 90 and creating the occurrence of the dry spot 38.

Thus, the present disclosure recognizes and takes into account the advantages of mitigating the occurrences of the dry spots between the pair of attitudes 134 of the vehicle 12 over the period of time 136.

Figure 5:
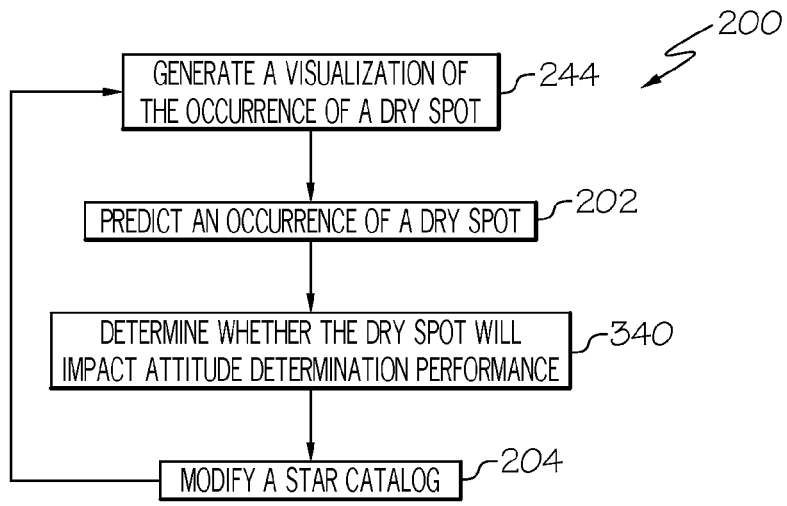
FIG. 5 is a flow diagram of one embodiment of the disclosed method for mitigating an occurrence of a dry spot.

Referring to FIG. 5, and with reference to FIGS. 1-4, one embodiment of the disclosed method, generally designated 200, for mitigating the occurrence of the dry spot 38 may include predicting the occurrence of the dry spot 38, (FIG. 4) as shown at block 202, determining whether the dry spot 38 may impact attitude determination performance of the vehicle 12 (e.g., the apparatus 18), and modifying (e.g., repairing) the star catalog 34 (FIG. 3) to reduce (e.g., limit or eliminate) an impact on the attitude determination performance of the vehicle 12 due to the dry spot 38, as shown at block 204. As described herein above, the impact of the dry spot 38 may include impacting the operation of the star tracker 28 to determine the attitude of the vehicle 12 and/or preventing the star tracker 28 from maintaining an attitude estimate of the vehicle 12 having a required accuracy.

Referring to FIG. 5, and with reference to FIGS. 1, 2, 4, and 7, in one embodiment, the method 200 may include generating a visualization 84 (FIG. 7) of the occurrence of the dry spot 38 (FIG. 4), as shown at block 244.

Figure 6:
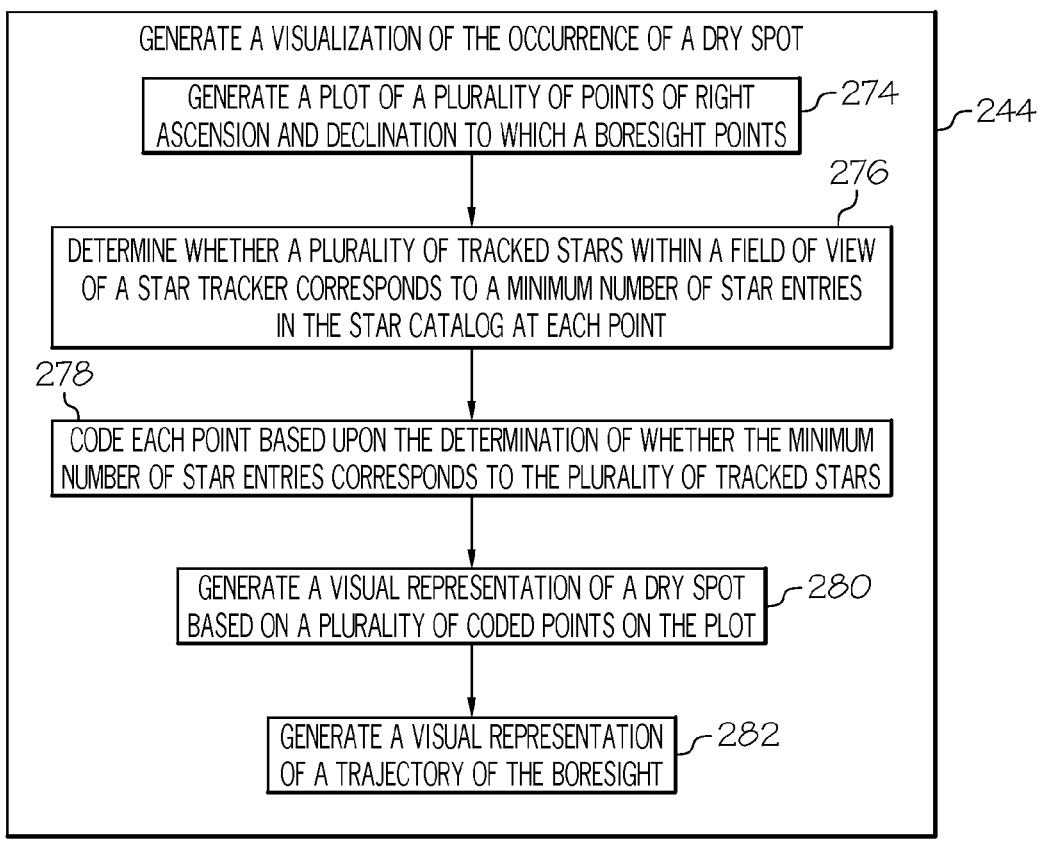
FIG. 6 is a flow diagram of one embodiment of the method for generating the visualization of the occurrence of the dry spot represented in FIG. 5.

Referring to FIG. 6, and with reference to FIGS. 1, 2, 4, and 7, generating the visualization 84 of the occurrence of the dry spot 38 (block 244) may include generating a plot 138. The plot 138 (FIG. 7) may including a plurality of points of right ascension 98 and declination 96 to which the boresight 46 (FIG. 2) of the star tracker 28 points at a plurality of attitudes 134 (FIG. 7) of the vehicle 12 (FIG. 1).

As shown at block 276, whether the plurality of tracked stars 90 within the field of view 42 of the star tracker 28 corresponds to a minimum number of star entries 50a in the star catalog 34 at each point of the plurality of points may be determined.

As one example implementation, and used throughout the present disclosure, determining whether the plurality of tracked stars 90 within the field of view 42 of the star tracker 28 corresponds to a minimum number of star entries 50a in the star catalog 34 may include determining whether the plurality of tracked stars 90 within the field of view 42 includes a minimum number of stars 20a represented in the star catalog 34 as star entries 50a (e.g., are identified stars 52a) required to aid in determining the attitude of the vehicle 12, properly estimate error, and/or aid in maintaining the coarse attitude of the vehicle 12. The star catalog 34 may include star entries 50a representing a plurality of stars 20. The minimum number star entries 50a (e.g., the required minimum number of star entries 50a) may be based on the minimum number of identified stars 52a (e.g., the tracked stars 90a having a corresponding star entry 50a in the star catalog 34) required to properly estimate error and/or aid in maintaining the coarse attitude of the vehicle 12.

As one example, if the star catalog 34 includes the required minimum number of star entries 50a representing the stars 20a being tracked by the star tracker 28 (e.g., the tracked stars 90a), then plurality of tracked stars 90 within the field of view 42 of the star tracker 28 does correspond to the minimum number of star entries 50a in the star catalog 34. As one example, if the star catalog 34 does not include the required minimum number of star entries 50a representing the stars 20a being tracked by the star tracker 28 (e.g., the tracked stars 90a), then plurality of tracked stars 90 within the field of view 42 of the star tracker 28 does not correspond to the minimum number of star entries 50a in the star catalog 34.

As shown at block 278, each point may be coded based upon the determination of whether the minimum number of star entries 50a in the star catalog 34 corresponds to the plurality of tracked stars 90.

In one example implementation, the coding operation (block 278) may include color-coding each point on the plot 138. As one example, when a determination is made that more than the minimum number of star entries 50a correspond to the plurality of tracked stars 90, that point may be coded with a first color (e.g., blue). Points coded with the first color may visually represent an attitude 134 where a high number of the tracked stars 90a are identified stars 52a and, thus, a dry spot 38 is unlikely to occur. As one example, when a determination is made that the minimum number of star entries 50a correspond to the plurality of tracked stars 90, that point may be coded with a second color (e.g., yellow). Points coded with the second color may visually represent an attitude 134 where a low number of tracked stars 90a are identified stars 52a, but a dry spot 38 is unlikely to occur. As one example, when a determination is made that less than the minimum number of star entries 50a correspond to the plurality of tracked stars 90, that point may be coded with a third color (e.g., red). Points coded with the third color may visually represent an attitude 134 where too few tracked stars 90a are identified stars 52a and, thus, a dry spot 38 is likely to occur.

As shown at block 280, a visual representation 132 of the dry spot 38 may be generated based on the plurality of coded points on the plot 138. As one example, a plurality of points coded with the first color may define a visual representation 140 of an area where more than the minimum number of star entries 50a corresponds to the plurality of tracked stars 90 (e.g., a safe area). As one example, a plurality of points coded with the second color may define a visual representation 142 of an area where the minimum number of star entries 50a corresponds to the plurality of tracked stars 90 (e.g., a safe area). As one example, a plurality of points coded with the third color may define a visual representation 132 of an area where less than the minimum number of star entries 50a corresponds to the plurality of tracked stars 90 (e.g., the dry spot 38). One or more visual representations 132 (identified individually as visual representations 132a, 132b) of dry spots 38 may be included on the same visualization 84.

As shown at block 282, a visual representation 130 of the trajectory of the boresight 46 of the star tracker 28 may be generated. The trajectory of the boresight 46 may be determined by declination 96 and right ascension 98 of the boresight 46 at the plurality of attitudes 134 of the vehicle 12. As one example, the visual representation 130 of the trajectory may represent the declination 96 and right ascension 98 at which the boresight 46 is pointed over the course of a time period (e.g., a year, a day, an hour, etc.). One or more visual representations 130 (identified individually as visual representations 130a, 130b, 130c, and 130d) of the trajectory of the boresight 46 may be included on the same visualization 84.

As one example, a first visual representation 130a may represent the trajectory of the boresight 46 over a first time period T1; a second visual representation 130b may represent the trajectory of the boresight 46 over a second time period T2; a third visual representation 130c may represent the trajectory of the boresight 46 over a third time period T3; and a fourth visual representation 130d may represent the trajectory of the boresight 46 over a fourth time period T4. Those skilled in the art will recognize that any number of visual representations 130 of the trajectory of the boresight 46 over any number of time periods may be included in the visualization 84.

Figure 7:
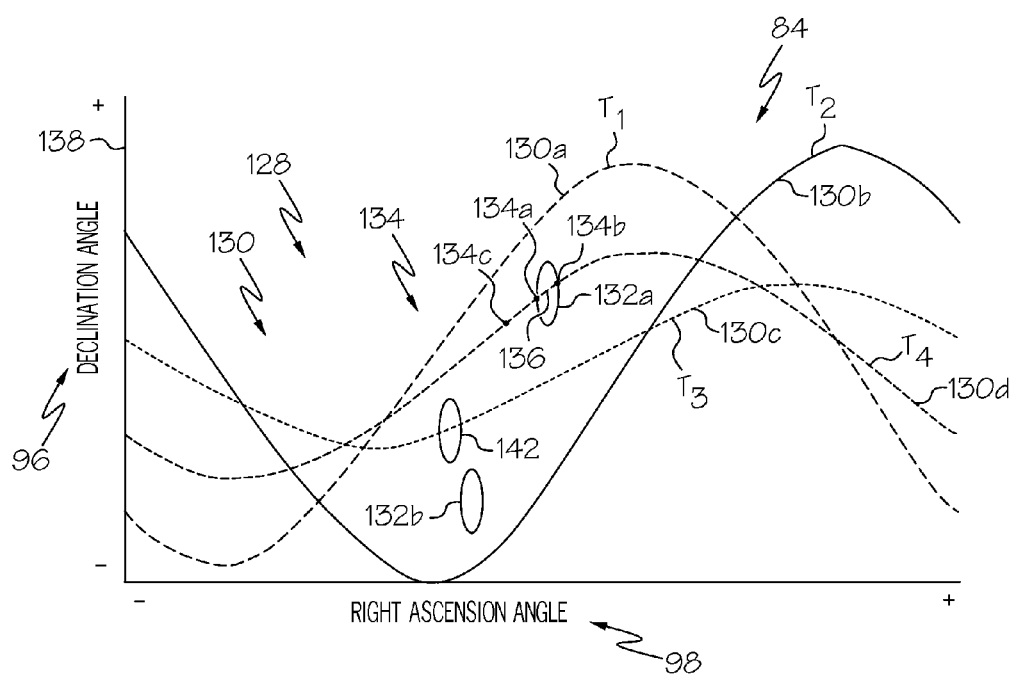
FIG. 7 is a schematic illustration of one embodiment of the visualization of the occurrence of the dry spot.

As shown at block 284, whether the dry spot 38 will impact operation of the star tracker 28 may then be determined. As one example, such a determination may be made by determining whether the visual representation 130 of the trajectory of the boresight 46 intersects the visual representation 132 of the dry spot 38. For example, the visual representation 130 of the trajectory of the boresight 46 may be superimposed on the plot 138, as illustrated in FIG. 7. As depicted, the first visual representation 130a over the first time period T1, the second visual representation 130b over the second time period T2, and the third visual representation 130 over the third time period T3 do not intersect the visual representations 132a, 132b of the dry spot 38 and, thus, the dry spots 38 may not impact operation of the star tracker 28. The third visual representation 130 over the third time period T3 intersects the visual representation 142, however, there may be no impact on the operation of the star tracker 28 but the area represented by the visual representation 142 may be monitored and/or further investigated. The fourth visual representation 130d over the fourth time period T4 intersects the visual representation 132a of the dry spot 38 and, thus, that dry spot 38 may impact operation of the star tracker 28.

Thus, the visualization 84 may determine whether there are severe dry spots 38, few dry spots 38, or no dry spots 38 in an area and when there are dry spots 38, if and/or how those dry spots 38 may impact the operation of the sky tracker 28. Additionally, the visualization 84 may visually identify and/or predict the location of the occurrence of the dry spot 38, the date of the occurrence of the dry spot 38, and/or the duration of the occurrence of the dry spot 38 by the intersection of the visual representation 130 of a trajectory of the boresight 46 with the visual representation 132 of the dry spot 38. As one example, the visual representation 132 of the dry spot 38 may represent the location (e.g., the right ascension and declination), the date (e.g., the date/time the boresight 46 enters the dry spot 38), and/or the duration (e.g., the time period between the boresight 46 entering and exiting the dry spot 38) of the occurrence of the dry spot 38 corresponding to the plurality of attitudes 134 of the vehicle 12.

Figure 9:
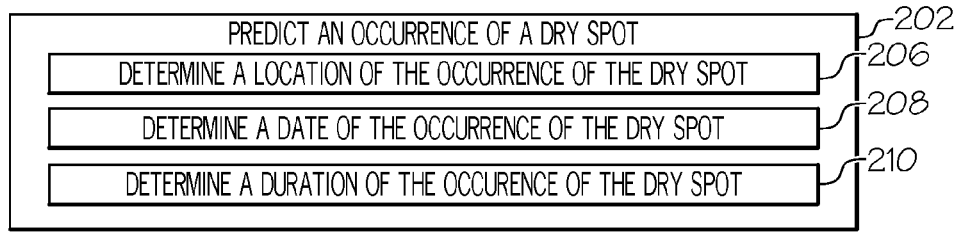
FIG. 9 is a schematic block diagram of one embodiment of the method for predicting the occurrence of the dry spot represented in FIG. 5.

Referring to FIG. 9, in one embodiment, predicting the occurrence of the dry spot 38 (block 202) may include at least one of: determining a location of the occurrence of the dry spot 38, as shown at block 206; determining a date of the occurrence of the dry spot 38, as shown at block 208; and/or determining a duration of the occurrence of the dry spot 38, as shown at block 210.

Figure 10:
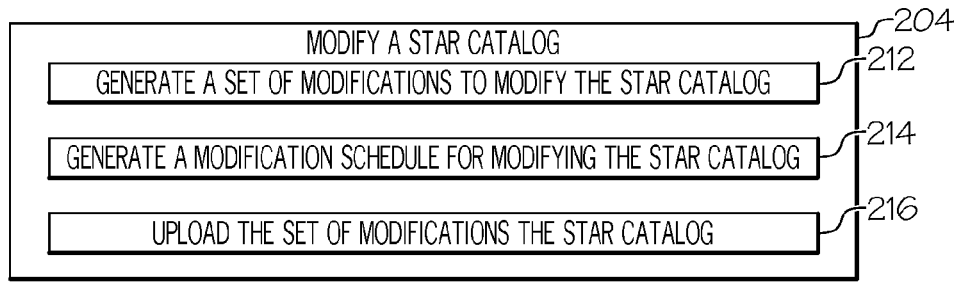
FIG. 10 is a schematic block diagram of one embodiment of the method for modifying the star catalog represented in FIG. 5.

Referring to FIG. 10, in one embodiment, modifying the star catalog 34 of the star tracker 28 (block 204) may include at least one of: generating a proposed set of modifications 36 to modify the star catalog 34, as shown at block 212; generating a modification schedule 68 for modifying the star catalog 34 with the set of modifications 36, as shown at block 214; and uploading the set of modifications 36 to the star catalog 34, as shown at block 216. As will be described in more detail herein, the set of modifications 36 may include one or more modification star entries 86a for modifying the plurality of star entries 50 of the star catalog 34.

Figure 8:
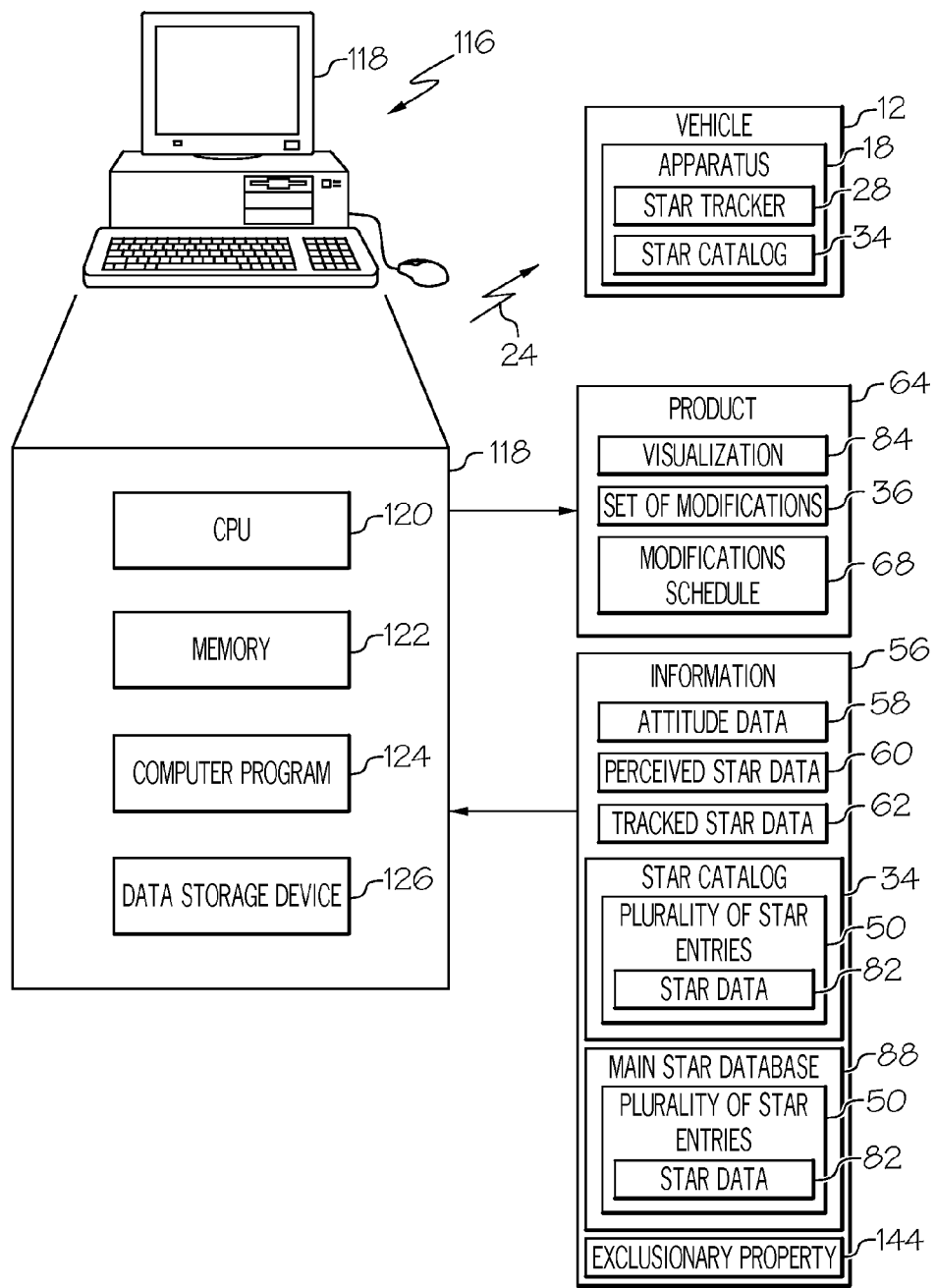
FIG. 8 is a schematic block diagram of one embodiment of a computer system for implementing the disclosed method represented in FIG. 5.

Referring to FIG. 8, in one embodiment, the disclosed method 200 may be implemented by a computer system 116, as shown by an exemplary hardware environment. As one example, the computer system 116 may include one or more computing device 118 (e.g., a computer) executing one or more computer programs 124 embodying the disclosed method 200. Generally, the computing device 118 may include of one or more CPUs 120, various amounts of memory 122 (e.g., RAM) storing the computer programs 124 and other data, and other components, such as those typically found in computers. In addition, the computing device 118 may include one or more monitors, fixed or removable data storage devices 126 (e.g., hard disk drives, floppy disk drives, and/or CD-ROM drives), and/or input devices (e.g., mouse pointing devices and/or keyboards).

The computing device 118 may operate under the control of an operating system (e.g., Windows, Macintosh, UNIX, or the like). Further, the computing device 118 may execute one or more computer programs 124 under the control of the respective operating systems. As one example, the disclosed method 200 may be implemented as one or more computer programs 124 executed by the computing device 118, although those skilled in the art will recognize that the computer programs 124 may also be executed on a client or network computer.

Generally, the computer programs 124 implementing the disclosed method 200 may be tangibly embodied in a non-transitory computer-readable medium (e.g., one or more of the fixed and/or removable data storage devices 126 coupled to the computing device 118). As one example, under control of the operating system, the computer program 124 may be loaded from the data storage devices 126 into the memory 122 of the computing device 118 for subsequent execution by the CPU 120. The computer program 124 may include instructions that, when read and executed by the computing 118, causes the computing device 118 to perform the steps, operations, and/or processes necessary to execute the steps, operations and/or elements of the disclosed method 200.

Those skilled in the art will recognize that the hardware environment illustrated in FIG. 8 is not intended to be limiting. Those skilled in the art will recognize that other hardware environments may be used without departing from the scope of the present disclosure.

In one example implementation of the disclosed method 200, a variety of information 56 (e.g., input data) may be provided to and/or generated by the computer programs 124 for execution by the computing device 118 as a variety of products 64 (e.g., output data). As one example, the information 56 may include, but is not limited to, attitude data 58, perceived star data 60, tracked star data 62, the plurality of star entries 50 of the star catalog 34, the star data 82 for each star entry 50a, exclusionary properties 144 for the star 20a, and/or the main star data base 88. As one example, the product 64 may include, but is not limited to, the set of modifications 36, the modification schedule 68, and/or the dry spot visualization 84.

Figure 11:
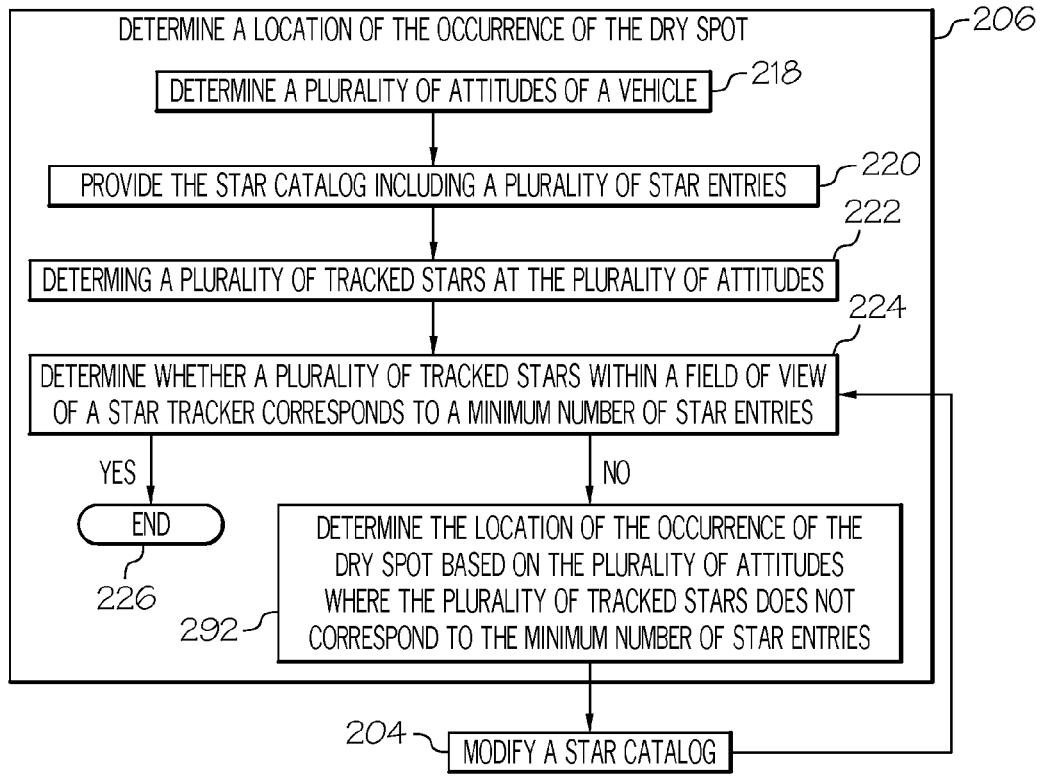
FIG. 11 is a flow diagram of one embodiment of the method for determining the location of the occurrence of the dry spot represented in FIG. 9.

Referring to FIG. 11, in one embodiment, determining the location of the occurrence of the dry spot 38 (block 206) may include determining a plurality of attitudes 134 of the vehicle 12, as shown at block 218.

In one example implementation, the plurality of attitudes 134 of the vehicle 12 may be determined from the attitude data 58 (FIG. 8). As one example, the attitude data 58 may include discrete attitude information for the vehicle 12 at a given time coordinate of a plurality of time coordinates. The attitude 134 of the vehicle 12 may define the field of view 42 and the boresight 46 of the star tracker 28 at the time coordinate. The time coordinate may include a date/time set associated with each attitude 134. As one example, the time period between a pair of time coordinates may define a portion of the flight of the vehicle (e.g., the period of time 136). As one example, the plurality of time coordinates may define the full duration of flight of the vehicle 12. For example, the duration of flight of the vehicle 12 may include a flight time from a beginning of life of the vehicle 12 to an end of life of the vehicle 12 (e.g., attitude history), for example, the flight time of a satellite.

As one example, the attitude data 58 may be provided, for example, from a reference list or index containing the attitude history of the vehicle 12. As used herein, the attitude history may include a set of dates/times and an associated attitude 134 of the vehicle 12 (e.g., in quaternion form) for each date/time set. Thus, the attitude data 58 may include the plurality of time coordinates (e.g., date/time sets) and an associated plurality of attitudes 134 of the vehicle 12 at the plurality of time coordinates. As one example, each time coordinate of the plurality of time coordinates may be spaced apart by a time duration (e.g., an interval). As one example, the time duration may be no greater than 30 minutes. As one example, the time duration may be no greater than 15 minutes. As one example, the time duration may be no greater than 5 minutes. As one example, the time duration may be no greater than 1 minute. As one example, the time duration may be no greater than 30 seconds. As one example, the time duration may be no greater than 15 seconds. As one example, the time duration may be no greater than 1 second. The time duration between each time coordinate of the plurality of time coordinates may be the same or may be different.

In certain cases, the time duration may be too large of an interval to adequately determine the location and/or duration of the dry spot 38 between a pair of attitudes 134. If the time duration between time coordinates of first attitude data is too large, then second attitude data may be generated until the time duration is sufficiently small. As one example, first attitude data may be provided, for example, from the reference list or index containing the attitude history of the vehicle 12. The first attitude data may include a plurality of first time coordinates and an associated plurality of first attitudes of the vehicle 12 at the plurality of first time coordinates. Each first time coordinate of the plurality of first time coordinates may be spaced apart by a first time duration, which is too large of an interval. The second attitude data may be generated from the first attitude data. As one example, generating the second attitude data may include interpolating the first attitude data. The second attitude data may include a plurality of second time coordinates (e.g., date/time sets) and an associated plurality of second attitudes of the vehicle 12 at the plurality of second time coordinates. Each first time coordinate and second time coordinate may be spaced apart by a second time duration (e.g., less than the first time duration), which is sufficiently small to adequately determine the location and/or duration of the dry spot 38 between a pair of attitudes 134. The second time duration between each first and second time coordinate may be the same or may be different.

In certain cases the time duration between time coordinates ("ΔT") needs to be the same (e.g., the time coordinates need to be evenly spaced). As one example, if a first time coordinate (e.g., date/time set) is X, then the second time coordinate must be X+ΔT, the third time coordinate must be X+2ΔT, the fourth time coordinate must be X+3ΔT, etc. If the time duration between time coordinates of first attitude data (e.g., attitude data provided from the attitude history) is not the same (e.g., an irregular time duration), then second attitude data may be generated until the time duration between all the time coordinates (e.g., between the plurality of first time coordinates and the plurality of second time coordinates) of the attitude data 58 (e.g., the first attitude data and the second attitude data) is the same (e.g., a regular time duration). As one example, generating the second attitude data may include interpolating the first attitude data.

Thus, the operational step of determining the plurality of attitudes 134 of the vehicle 12 (block 218) may provide attitude data 58 in the required form (e.g., evenly spaced time durations and/or sufficiently small time durations). Those skilled in the art will recognize that the total number of attitudes, the time duration between attitudes, and/or the length of the regular time duration between attitudes may depend upon various factors, such as, the type of vehicle 12 and/or star tracker 28.

Referring still to FIG. 11, as shown at block 220, the star catalog 34 including the plurality of star entries 50 may be provided. In one example implementation, the star catalog 34 including the plurality of star entries 50 may be or may be a representation of the star catalog 34 included in the memory 32 of the apparatus 18 of the vehicle 12. For example, the star catalog 34 may include the plurality of star entries 50 initially selected from the main star database 88.

As shown at block 222, the plurality of tracked stars 90 within the field of view 42 of the star tracker 28 may be determined at the plurality of attitudes 134. In one example implementation, the plurality of tracked stars 90 within the field of view 42 of the star tracker 28 at the plurality of attitudes 34 may be determined from the perceived star data 60 and/or the tracked star data 62.

As one example, the perceived star data 60 may be provided, for example, from a reference list of index containing a list of stars 20*a* known to be and/or predicted to be within the field of view 42 of the star tracker 28 (e.g., perceived stars 48*a*) at the plurality of attitudes 134 (block 218). The plurality of tracked stars 90 may be generated from the perceived star data 60 (e.g., selected from the list of perceived stars 48*a*). As one example, the plurality of tracked stars 90 may be selected based on one or more metrics 70*a* contained in the star data 82. As one example, the plurality of tracked stars 90 may be selected from the plurality of perceived stars 48 having the greatest brightness value 100 (e.g., the brightest stars 20*a* within the field of view 42 of the star tracker 28 at the attitude 134), which are the perceived stars 48*a* most likely to be tracked by the star tracker 28.

As one example, the tracked star data 62 may be provided, for example, from a reference list or index containing a list of the brightest perceived stars 48*a* known to be or predicted to be within the field of view 42 of the star tracker 28 at the plurality of attitudes (block 218). The plurality of tracked stars 90 may be generated from the tracked star data 62 (e.g., selected from the list of the brightest perceived stars 48*a*).

Referring still to FIG. 11, as shown at block 224, whether the plurality of tracked stars 90*a* within the field of view 42 of the star tracker 28 corresponds to the minimum number of star entries 50*a* of the plurality of star entries 50 in the star catalog 34 (e.g., the minimum number of stars 20*a* represented in the star catalog 34 as star entries 50*a*) may be determined. As expressed herein above, the minimum number star entries 50*a* may be based on the minimum number of identified stars 52*a* (e.g., the tracked stars 90*a* having a corresponding star entry 50*a* in the star catalog 34) required to aid in determining attitude, properly estimate error, and/or aid in maintaining the coarse attitude of the vehicle 12. Determining whether the plurality of tracked stars 90*a* corresponds to the minimum number of star entries 50*a* (e.g., at least the required minimum number) (block 224) may include comparing the determined plurality of tracked stars 90 (block 222) to the plurality of star entries 50 in the star catalog 34 and determining whether the plurality of tracked stars 90 are represented by the minimum number of star entries 50*a* in the star catalog 34 (e.g., representing the plurality of stars 20).

If the plurality of tracked stars 90 does correspond to the minimum number of star entries 50*a* (e.g., the minimum number of identified stars 52*a* is present), then the dry spot 38 may not occur at the plurality of attitudes 134 (block 218) and no action may be required or taken to modify the star catalog 34 onboard the vehicle 12 and the operation may end, as shown at block 226.

If the plurality of tracked stars 90 does not correspond to the minimum number of star entries 50*a* (e.g., the minimum number of identified stars 52*a* is not present), then the location of the occurrence of the dry spot 38 may be determined based on the plurality of attitudes 134 where the plurality of tracked stars 90 does not correspond to the minimum number of star entries 50*a* in the star catalog 34, as shown at block 292. Since the dry spot 38 may occur at the determined location (e.g., the plurality of attitudes 134 (block 218)), action may be required or taken to modify the star catalog 34 onboard the vehicle 12 (block 204).

In one example implementation, one or more of the steps and/or operations of the disclosed method 200 may include one or more iterative cycles in order to mitigate the occurrences of dry spots 38 at the determined plurality of attitudes 134 (block 218) of the vehicle 12. As one example, upon modification of the star catalog 34 (block 204), the determination of whether the minimum number of star entries 50*a* correspond to the plurality of tracked stars 90 (block 224) may be repeated based on the modified plurality of star entries in the modified star catalog (e.g., the combination of star entries 50*a* originally included in the star catalog 34 and the modification star entries 86*a* modifying the star catalog 34) until the minimum number of star entries 50*a* corresponds to plurality of tracked stars 90 (e.g., until the minimum number of identified stars 52*a* are present) at the plurality of attitudes 134 (block 218), as illustrated in FIG. 11.

In one example implementation, one or more of the steps and/or operations of the disclosed method 200 may include one or more iterative cycles in order to mitigate the occurrences of dry spots 38 throughout the attitude history of the vehicle 12. As one example, the prediction of the occurrence of the dry spot 38 (block 202) (e.g., the determination of the location of the occurrence of the dry spot (block 206)) may be repeated for all of attitudes 134 defining the attitude history of the vehicle 12. For example, the determination of the plurality of attitudes 134 of the vehicle 12 (block 218) may be repeated for all attitudes and the steps and/or operations illustrated in blocks 220, 222, 224, and 292 may be repeated for all attitudes 134 of the attitude history.

Figure 12:
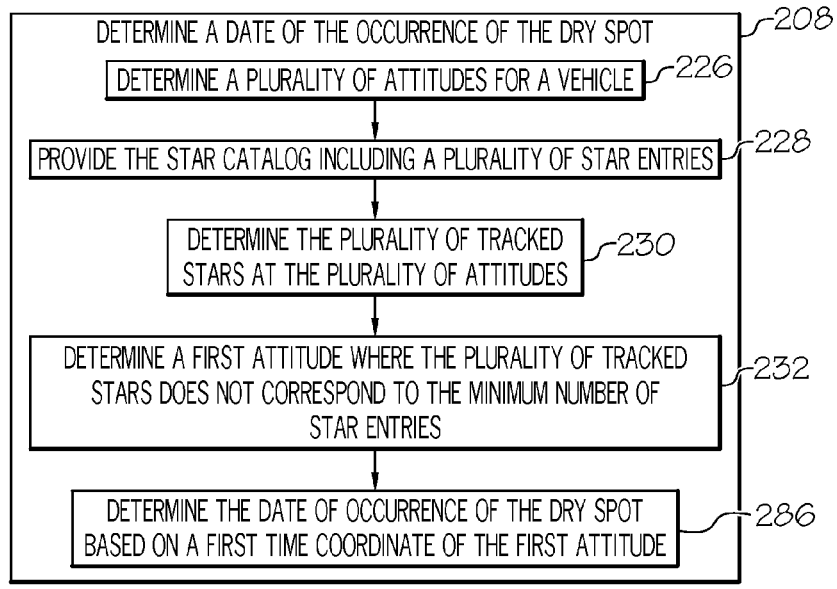
FIG. 12 is a flow diagram of one embodiment of the method for determining the date of the occurrence of the dry spot represented in FIG. 9.

Referring to FIG. 12, in one embodiment, determining the date of the occurrence of the dry spot 38 (block 208) may include determining a plurality of attitudes 134 of the vehicle 12, as shown at block 226. In one example implementation, the plurality of attitudes 134 of the vehicle 12 may be determined from the attitude data 58, for example, in substantially the same manner as described herein above (e.g., block 218 of FIG. 11). The attitude data 58 may include discrete attitude information of the vehicle 12 at each time coordinate of the plurality of time coordinates. The time coordinate may include a date/time set associated with each attitude 134 of the plurality of attitudes 134.

As shown at block 228, the star catalog 34, including the plurality of star entries 50, may be provided. In one example implementation, the star catalog 34 including the plurality of star entries 50 may be or may be a representation of the star catalog 34 included in the memory 30 of the apparatus 18 of the vehicle 12. For example, the star catalog 34 may include the plurality of star entries 50 initially selected from the main star database 88.

As shown at block 230, the plurality of tracked stars 90 within the field of view 42 of the star tracker 28 of the plurality of attitudes 134 (e.g., at each attitude 134) may be determined. In one example implementation, the plurality of tracked stars 90 within the field of view 42 of the star tracker 28 of the plurality of attitudes 134 (block 226) may be determined from the perceived star data 60 and/or the tracked star data 62, for example, in a substantially similar manner as described herein above (e.g., block 222 of FIG. 11).

As shown at block 232, a first (e.g., initial) attitude 134*a* of the plurality of attitudes 134 where the plurality of tracked stars 90 does not correspond to the minimum number of star entries 50*a* in the star catalog 34 may be determined. In one example implementation, the first attitude 134*a* (FIG. 7) of the plurality of attitudes 134 where the determined plurality of tracked stars 90 (e.g., block 230) does not correspond to the minimum number of star entries 50*a* may be determined by determining the first attitude 134*a* (and an associated first time coordinate) of a chronological sequence of attitudes where (e.g., at what attitude) or when (e.g., at what time coordinate) the plurality of tracked stars 90 does not correspond to the minimum number of star entries 50*s* does not correspond to the plurality of tracked stars 90. The minimum number of star entries 50*a* required may be based on the minimum number of identified stars 52*a* (e.g., the tracked stars 90*a* having a corresponding star entry 50*a* in the star catalog 34) required to properly estimate error and/or aid in maintaining the coarse attitude of the vehicle 12. Determining whether the plurality of tracked stars 90 corresponds to the minimum number of star entries 50*s* may include comparing the plurality of tracked stars 90 to the plurality of star entries 50 in the star catalog 34 and determining if a required minimum number of tracked stars 90*a* (e.g., the minimum number of identified stars 52*a*) corresponds to the minimum number of star entries 50*a* in the star catalog 34, for example, in a substantially similar manner as described herein above (e.g., block 224 of FIG. 11).

As shown at block 286, the date of the occurrence of the dry spot 38 may be determined based on a first time coordinate (e.g., a date/time set) of the first attitude 134*a*. As one example, the first time coordinate associated with the first attitude 134*a* of the chronological sequence of attitudes 134 may define the date/time of the occurrence of the dry spot 38.

Figure 13:
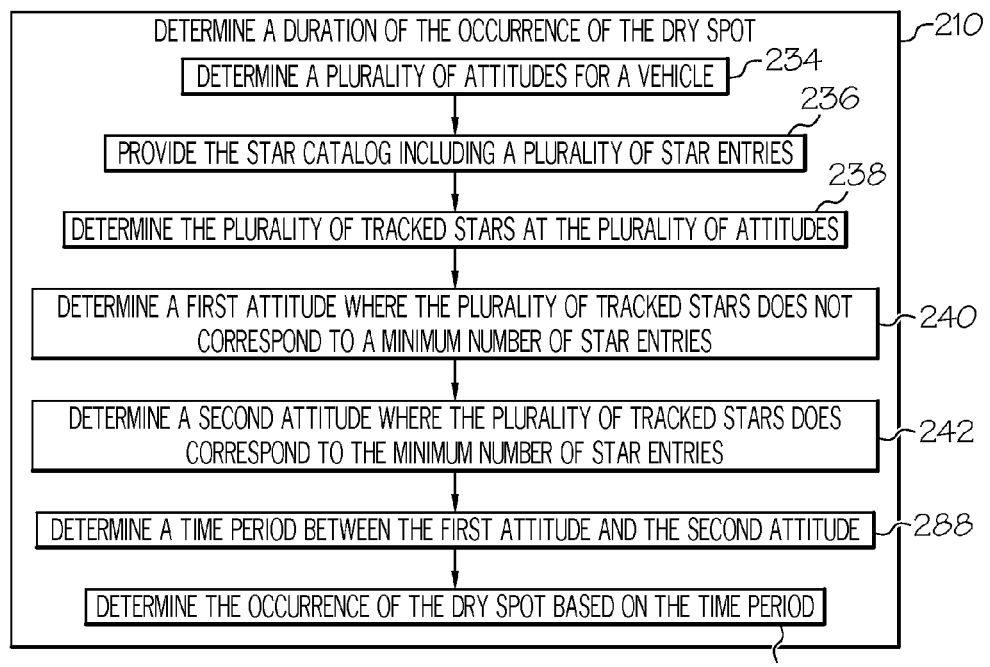
FIG. 13 is a flow diagram of one embodiment of the method for determining the duration of the occurrence of the dry spot represented in FIG. 9.

Referring to FIG. 13, in one embodiment, determining the duration of the occurrence of the dry spot 38 (block 210) may include determining the plurality of attitudes 134 of the vehicle 12, as shown at block 234. In one example implementation, the plurality of attitudes 134 of the vehicle 12 may be determined from the attitude data 58, for example, in substantially the same manner as described herein above (e.g., block 218 of FIG. 11). The attitude data 58 may include discrete attitude information of the vehicle 12 at each time coordinate of the plurality of time coordinates. The time coordinate may include the date/time set associated with each attitude 134 of the plurality of attitudes 134.

As shown at block 236, the star catalog 34, including the plurality of star entries 50, may be provided. In one example implementation, the star catalog 34 including the plurality of star entries 50 may be or may be a representation of the star catalog 34 included in the memory 30 of the apparatus 18 of the vehicle 12. For example, the star catalog 34 may include the plurality of star entries 50 initially selected from the main star database 88.

As shown at block 238, the plurality of tracked stars 90 within the field of view 42 of the star tracker 28 at the plurality of attitudes 134 (e.g., at each attitude) may be provided. In one example implementation, the plurality of tracked stars 90 within the field of view 42 of the star tracker 28 at the plurality of attitudes 134 (e.g., at each attitude) may be determined from the perceived star data 60 and/or the tracked star data 62, for example, in a substantially similar manner as described herein above (e.g., block 222 of FIG. 11).

As shown at block 240, a first (e.g., starting) attitude 134*a* (FIG. 7) of the plurality of attitudes 134 where the determined plurality of tracked stars (block 238) does not correspond to the minimum number of star entries 50*a* (e.g., at least the required minimum number) may be determined. In one example implementation, the first attitude 134*a* of the plurality of attitudes 134 where the plurality of tracked stars 90 does not correspond to the minimum number of star entries 50*a* (block 240) may be determined by determining the first attitude 134*a* (and an associated first time coordinate) of a chronological sequence of attitudes where (e.g., at what attitude) or when (e.g., at what time coordinate) the plurality of tracked stars 90 does not correspond to the minimum number of star entries 50*a*, for example, in a substantially similar manner as described herein above (e.g., block 232 of FIG. 12). The minimum number of star entries 50*a* may be based on the minimum number of identified stars 52*a* (e.g., the tracked stars 90*a* having a corresponding star entry 50*a* in the star catalog 34) required to properly estimate error and/or aid in maintaining the coarse attitude of the vehicle 12. Determining whether the plurality of star entries 90 corresponds to the minimum number of star entries 50*a* may include comparing the plurality of tracked stars 90 to the plurality of star entries 50 in the star catalog 34 and determining if the plurality of tracked stars 90 corresponds to the minimum number of star entries 50*a* (e.g., at least the required minimum number of star entries 50*a*), for example, in a substantially similar manner as described herein above (e.g., block 224 of FIG. 11). The time coordinate associated with the first attitude 134*a* of the chronological sequence of attitudes 134 may define the start of the occurrence of the dry spot 38.

As shown at block 242, a second (e.g., ending) attitude 134*b* (FIG. 7) of the plurality of attitudes 134 where the plurality of tracked stars 90 does correspond to the minimum number of star entries 50*a* (e.g., at least the required minimum number) may be determined. The second attitude 134*b* may occur after the first attitude 134*a*. In one example implementation, the second attitude 134*b* of the plurality of attitudes 134 where the plurality of tracked stars 90 does correspond to the minimum number of star entries 50*a* (block 242) may be determined by determining the second attitude 134*b* (and associated second time coordinate) of a chronological sequence of attitudes 134 where (e.g., at what attitude) or when (e.g., at what time coordinate) the plurality of tracked stars 90 correspond to the minimum number of star entries 50*a*.

The minimum number of star entries 50*a* may be based on the minimum number of identified stars 52*a* (e.g., the tracked stars 90*a* having a corresponding star entry 50*a* in the star catalog 34) required to properly estimate error and/or aid in maintaining the coarse attitude of the vehicle 12. Determining whether the plurality of tracked stars 90 corresponds to the minimum number of star entries 50 (e.g., at least the minimum number of star entries 50*a*) may include comparing the plurality of tracked stars 90 to the plurality of star entries 50 in the star catalog 34 and determining if the plurality of tracked stars 90 corresponds to the minimum number of star entries 50*a*, for example, in a substantially similar manner as described herein above (e.g., block 224 of FIG. 11). The second time coordinate associated with the second attitude 134*b* of the chronological sequence of attitudes 134 may define the end of the occurrence of the dry spot 38.

As shown at block 288, a time period 136 (FIG. 7) between the first time coordinate of the first attitude 134*a* and the second time coordinate of the second attitude 134*b* may be determined. As one example, the duration of time between the first time coordinate (e.g., at the first attitude 134*a*) and the second time coordinate (e.g., at the second attitude 134*b*) may define the time period 136.

As shown at block 290, the duration of the occurrence of the dry spot 38 may be determined based on the time period 136. As one example, the time period 136 between the first time coordinate (e.g., at the first attitude 134*a*) and the second time coordinate (e.g., at the second attitude 134*b*) may define the duration of the occurrence of the dry spot 38.

Referring to FIG. 9, those skilled in the art will recognize that the steps and/or operations shown at blocks 206, 208, and 210 may occur substantially concurrently (e.g., at the same time) or may occur separately (e.g., at different times).

Figure 14:
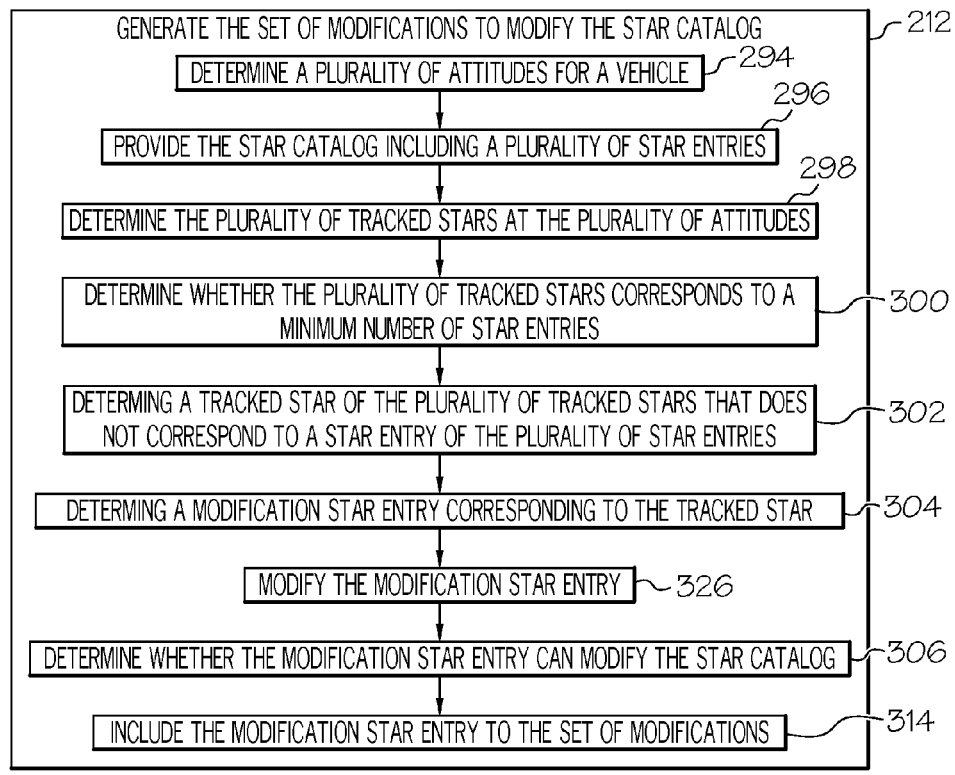
FIG. 14 is a flow diagram of one embodiment of the method for generating the set of modifications to modify the star catalog as represented in FIG. 10.

Referring to FIG. 14, in one embodiment, generating the proposed set of modifications 36 to modify the star catalog 34 (block 212) may include determining a plurality of attitudes 134 of the vehicle 12, as shown at block 294. In one example implementation, the plurality of attitudes 134 of the vehicle 12 may be determined from the attitude data 58, for example, in substantially the same manner as described herein above (e.g., block 218 of FIG. 11).

As shown at block 296, the star catalog 34, including the plurality of star entries 50, may be provided. In one example implementation, the star catalog 34 including the plurality of star entries 50 may be or may be a representation of the star catalog 34 included in the memory 30 of the apparatus 18 of the vehicle 12. For example, the star catalog 34 may include the plurality of star entries 50 initially selected from the main star database 88.

As shown at block 298, the plurality of tracked stars 90 within the field of view 42 of the star tracker 28 at the plurality of attitudes 134 (e.g., at each attitude) may be determined. In one example implementation, the plurality of tracked stars 90 within the field of view 42 of the star tracker 28 at the plurality of attitudes 134 (e.g., at each attitude) may be determined from the perceived star data 60 and/or the tracked star data 62, for example, in a substantially similar manner as described herein above (e.g., block 222 of FIG. 11).

As shown at block 300, whether the plurality of tracked stars 90 corresponds to the minimum number of star entries 50*a* may be determined. The minimum number of star entries 50*a* required may be based on the minimum number of identified stars 52*a* (e.g., the tracked stars 90*a* having a corresponding star entry 50*a* in the star catalog 34) required to properly estimate error and/or aid in maintaining the coarse attitude of the vehicle 12. In one example implementation, determining whether the plurality of tracked stars 90 corresponds to the minimum number of star entries 50*a* may include comparing the plurality of tracked stars 90 to the plurality of star entries 50 in the star catalog 34 and determining if the plurality of tracked stars 90 corresponds to the minimum number of star entries 50*a*, for example, in a substantially similar manner as described herein above (e.g., block 224 of FIG. 11).

As shown at block 302, a tracked star 90*a* of the plurality of tracked stars 90 that does not correspond to a star entry 50*a* of the plurality of star entries 50 in the star catalog 34 may be determined. As one example, at least one tracked star 90*a* of the plurality of tracked stars 90 that does not correspond to a star entry 50*a* of the plurality of star entries 50 in the star catalog 34 may be determined. As one example, a set of tracked stars 90*a* of the plurality of tracked stars 90 that do not correspond to a star entry 50*a* of the plurality of star entries 50 in the star catalog 34 may be determined.

In one example implementation, the tracked star 90*a* that does not have a corresponding star entry 50*a* in the star catalog 34 may be determined by comparing a tracked star 90 (e.g., from the plurality of tracked stars 90 determined by the step and/or operation shown at block 298) to the plurality of star entries 50 (e.g., the plurality of star entries 50 in the star catalog 34 provided by the step and/or operation shown at block 296), determining if tracked star 90*a* has a corresponding star entry 50*a* in the star catalog 34, and identifying the tracked star 90*a* as not have a corresponding star entry 50*a* in the star catalog 34 (e.g., is not identified star 52*a*).

As shown at block 304, a modification star entry 86*a* corresponding to the tracked star 90*a* that does not correspond to a star entry 50*a* of the plurality of star entries 50 in the star catalog 34 may be determined. As used herein, the modification star entry 86*a* may be a star entry 50*a* from the main star database 88 that is currently not in the star catalog 34. As one example, at least one modification star entry 86*a* corresponding to at least one tracked star 90 that does not correspond to a star entry 50*a* may be determined. As one example, a set of modification star entries 86*a* corresponding to a set of tracked stars 90*a* that do not correspond to a star entry 50*a* may be determined.

In one example implementation, determining the modification star entry 86*a* corresponding to the tracked star 90*a* that does not correspond to a star entry 50*a* in the star catalog 34 (block 304) may include comparing the tracked star 90*a* to the plurality of star entries 50 in the main star database 88, determining whether the main star database 88 includes a star entry 50*a* corresponding to the tracked star 90*a* that does not have a corresponding star entry 50*a* in the star catalog 34, and selecting the star entry 50*a* corresponding to the tracked star 90*a* from the main star database 88 to be the modification star entry 86*a* (e.g., a candidate modification star entry).

If the main star database 88 does not include a star entry 50*a* corresponding to the tracked star 90*a* that does not correspond to a star entry 50*a* in the star catalog 34, then the tracked star 90*a* may be identified and/or documents as an unidentifiable star and another tracked star 90*a* that does not correspond to a star entry 50*a* in the star catalog 34 may be determined (e.g., block 302) and the step and/or operation shown at block 304 may be repeated until a suitable modification star entry 86*a* is found. If the number of suitable modification star entries 86*a* (e.g., defining the set of modifications 36) does not provide the minimum number of identified stars 52*a* (e.g., the minimum number of star entries 50*a* and modification star entries 86*a* do not correspond to the plurality of tracked stars 90), then the dry spot 38 may be identified and/or documented as an unfixable dry spot.

As shown at block 306, whether the modification star entry 86*a* can modify the star catalog 34 may be determined. As one example, determining whether the modification star entry 86*a* can modify the star catalog 34 may depend on whether the corresponding tracked star 90*a* is a suitably identifiable star 20*a*. As one example, determining whether the modification star entry 86*a* can modify the star catalog 34 may depend on whether the modification star entry 86*a* is a viable modification to the star catalog 34. As one example, determining whether the modification star entry 86*a* can modify the star catalog 34 may depend on whether one or more star entries 50*a* in the star catalog 34 may be removed and/or replaced.

Figure 15:
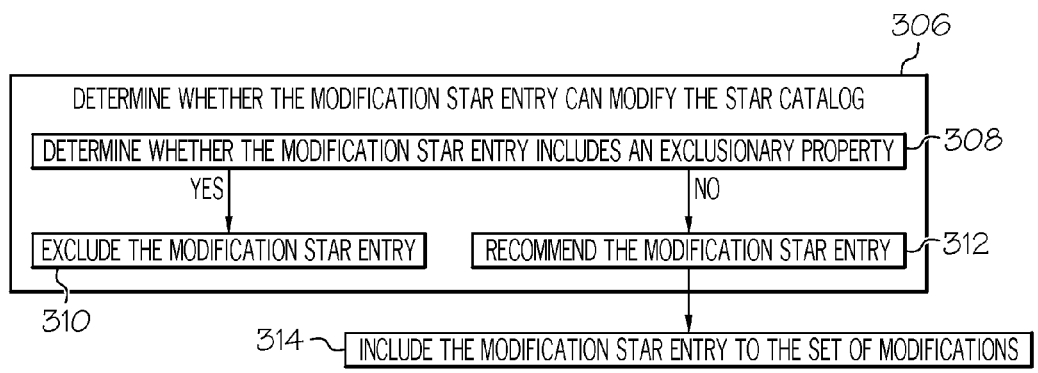
FIG. 15 is a flow diagram of one embodiment of the method for determining whether the modification star entry can modify the star catalog as represented in FIG. 14.

Referring to FIG. 15, in one embodiment, determining whether the modification star entry 86*a* can modify the star catalog 34 (block 306) may include determining whether the modification star entry 86*a* (e.g., the tracked star 90*a*) includes an (e.g., one or more) exclusionary property 144 (FIG. 8), as shown at block 308. The exclusionary property 144 may include any star property, characteristic, and/or metric that make the modification star entry 86*a* unsuitable and/or undesirable to modify the star catalog 34. For example, exclusionary properties 144 may include, but are not limited to, if a star 20*a* moves with respect to a celestial sphere at a relatively high rate (e.g., the position of the star 20*a* changes fast enough to potentially cause problems with attitude determination); if the star 20*a* (e.g., target star) has a near neighbor (e.g., another star 20*a* that is nearby or appears nearby when viewed from Earth) that may be mistaken for the target star; if the star 20*a* has a magnitude that varies widely over time, making the star 20*a* difficult to identify; and the like.

As shown at block 310, if the modification star entry 86*a* includes the exclusionary property 144, then the modification star entry 86*a* may be excluded from modifying the star catalog 34. As shown at block 312, if the modification star entry 86*a* does not include the exclusionary property, then the modification star entry 86*a* may be recommended for modifying the star catalog 34.

In one example implementation, the set of modifications 36 (e.g., one or more modification star entries 86*a*) may be added to the star catalog 34 without replacing any of the existing star entries 50*a* in the star catalog 34. In one example implementation, the set of modifications 36 (e.g., one or more modification star entries 86*a*) may replace one or more existing star entries 50*a* in the star catalog 34 (e.g., the existing star entries 50*a* may be removed from the star catalog 34).

Figure 16:
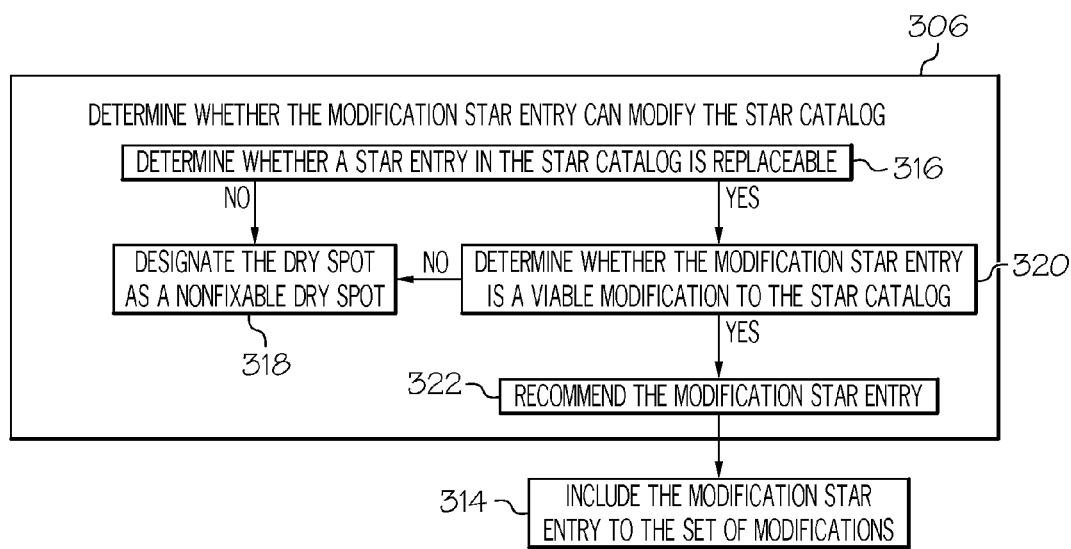
FIG. 16 is a flow diagram of one embodiment of the method for determining whether the modification star entry can modify the star catalog as represented in FIG. 14.

Referring to FIG. 16, in one embodiment (e.g., in the case where one or more star entries 50*a* are replaced by one or more modification star entries 86*a*), determining whether the modification star entry 86*a* can modify the star catalog 34 (block 306) may include determining whether the star entry 50*a* (e.g., one or more existing star entries) in the star catalog 34 is replaceable, as shown at block 316.

In one example implementation, determining whether the star entry 50*a* in the star catalog 34 is replaceable (block 316) may include determining whether the star entry 50*a* meets one or more replacement criteria. A variety of replacement criteria may determine whether the star entry 50*a* in the star catalog 34 is a replaceable star entry 50*a*. As one example, the replacement criteria may require that the star entry 50*a* to be replaced cannot be associated with another star entry 50*a* in the star catalog 34 (e.g., is not paired to another star entry 50*a* in the star catalog index). As one example, the replacement criteria may require that the star entry 50*a* to be replaced have a brightness value 100 (e.g., a brightness) less than the modification star entry 86*a*. For example, a star entry 50*a* of the star catalog 34 may only be replaced by a modification star entry 86*a* having a greater brightness value 100.

If the star entry 50*a* in the star catalog 34 is not replaceable, then another (e.g., different) tracked star 90*a* that does not correspond to a star entry 50*a* in the star catalog 34 may be determined (e.g., block 302) and the step and/or operation shown at blocks 304 and 306 may be repeated until a suitable modification star entry 86*a* and a suitably replaceable star entry 50*a* is found. If the number of replaceable star entries 50*a* does not allow for a suitable number of modification star entries 86*a* (e.g., defining the set of modifications 36) to be added to the star catalog 34 in order to provide the minimum number of identified stars 52*a* (e.g., the minimum number of star entries 50*a* and modification star entries 86*a* do not correspond to the plurality of tracked stars 90), then the dry spot 38 may be identified and/or documented as an unfixable dry spot, as shown at block 318.

If the star entry 50*a* in the star catalog 34 is replaceable, then whether the modification star entry 86*a* (e.g., the candidate star entry 50*a* selected from the main star database 88) is a viable modification to the star catalog 34 may be determined, as shown at block 320. In one example implementation, determining whether the modified star entry 86*a* is a viable modification to the star catalog 34 (block 320) may include determining whether the modification star entry 86*a* meets replacement criteria. A variety of replacement criteria may determine whether the modified star entry 86*a* is a viable modification to the star catalog 34.

As one example, the replacement criteria may require that the modification star entry 86*a* have a predetermined proper motion (e.g., the proper motion is less than 0.5 arc-sec/year). As one example, the replacement criteria may require that the modification star entry 86*a* not represent a tracked star 90*a* that is within a predetermined distance from another tracked star 90*a* having a brightness value 100 sufficiently appreciable that the star tracker 28 is likely to track (e.g., the modification star entry 86*a* cannot represent a tracked star 90*a* that is too close to another bright tracked star 90*a*). Those skilled in the art will recognize that the predetermined distance between bright tracked stars 90*a* may depend on the type of star tracker 28 and/or the type of vehicle 12.

If the modification star entry 86*a* is not a viable modification to the star catalog 34, then another (e.g., different) tracked star 90*a* that does not correspond to a star entry 50*a* in the star catalog 34 may be determined (e.g., block 302) and the step and/or operation shown at blocks 316 and 320 may be repeated until a suitable modification star entry 86*a*, a suitably replaceable star entry 50*a*, and a viable modification star entry 86*a* is found. If the number of viable modification star entries 86*a* does not to provide the minimum number of identified stars 52*a* (e.g., the minimum number of star entries 50*a* and modification star entries 86*a* do not correspond to the plurality of tracked stars 90), then the dry spot 38 may be identified and/or documented as an unfixable dry spot (block 318).

If the modification star entry 86*a* is a viable modification to the star catalog 34, then the modification star entry may be recommended as a modification to the star catalog, as shown at block 322.

If the star entry 50*a* in the star catalog 34 are replaceable, then the modification star entry 86*a* may be recommended (block 262) and selected for inclusion to the star catalog 34 (block 254).

Referring to FIGS. 14-16, the modification star entry 86*a* may be included to the set of modifications 36 when recommended (block 312 and/or block 322), as shown at block 314. As one example, a plurality of recommended modification star entries 86 may be included to the set of modifications 36. In one example implementation, one or more of the steps and/or operations described for generating the set of modifications 36 to modify the star catalog 34 (block 212) may be repeated to select and add a plurality of modification star entries 86 sufficient to represent the minimum number of identified stars 52*a* (e.g., the minimum number of star entries 50*a* and modification star entries 86*a* in the star catalog 34 correspond to the plurality of tracked stars 90) required to properly estimate error and/or aid in maintaining the coarse attitude of the vehicle 12 (e.g., mitigate the occurrences of dry spots 38 throughout the attitude history of the vehicle 12).

Figure 17:
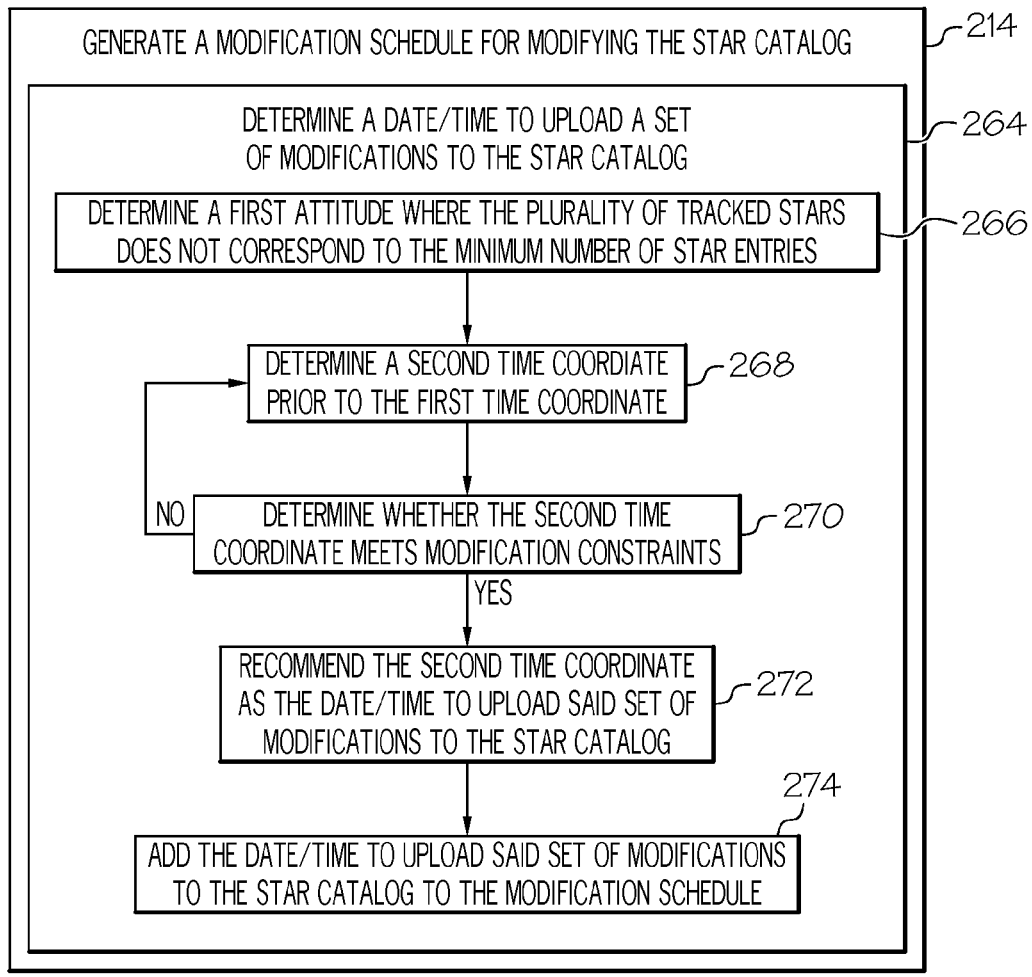
FIG. 17 is a flow diagram of one embodiment of the method for generating the modification schedule for modifying the star catalog as represented in FIG. 10.

Referring to FIG. 17, in one embodiment, generating the modification schedule 68 for modifying the star catalog 34 with the set of modifications 36 (block 214) may include determining a date/time for uploading the set of modifications 36 to the star catalog 34, as shown at block 264.

In one example implementation, determining the date/time for uploading the set of modifications 36 to the star catalog 34 (block 264) may include determining the first time coordinate (e.g., at the first attitude 134*a*) where the plurality of tracked stars 90 does not correspond to the minimum number of star entries 50*a*, as shown at block 266. As one example, the plurality of tracked stars 90 may be determined in a substantially similar manner as described herein above, for example, as shown at block 230 of FIG. 12. As one example, the first time coordinate where the plurality of tracked stars 90 does not correspond to the minimum number of star entries 50*a* may be determined in a substantially similar manner as described herein above, for example, as shown at block 232 of FIG. 12. As one example, determining the first time coordinate where the plurality of tracked stars 90 does not correspond to the minimum number of star entries 50*a* may include at least one of determining the date of the occurrence of the dry spot 38 (block 208 of FIGS. 9 and 12) or determining the duration of the occurrence of the dry spot 38 (block 210 of FIGS. 9 and 13).

As shown at block 268, a second time coordinate (e.g., a date/time set) may be determined prior to the first time coordinate. As an example, the second time coordinate may include an associated second attitude 134*c* (FIG. 7) occurring before the first attitude 134*a*.

As shown at block 270, whether the second time coordinate meets modification constraints may be determined. Those skilled in the art will recognize that multiple modification constraints may be applied to the determination of the second time coordinate. As one example, the modification constraint may include only date/times where the set of modifications 36 being uploaded to the star catalog 34 do not alter the star entries 50*a* in the star catalog 34 corresponding to the plurality of tracked stars 90 being tracked at that time coordinate (e.g., attitude). As one example, the determined date/time may be the time coordinate when the star entries 50*a* being changed (e.g., removed and/or replaced) by the modification star entries 86*a* are not being used to identify the plurality of tracked stars 90 being tracked by the star tracker 28 at that time coordinate.

If the second time coordinate does not meet the modification constraints (block 270), then another (e.g., different) second time coordinate prior to the first time coordinate may be determined (e.g., block 268).

If the second time coordinate does meet the modification constraints (block 270), then the second time coordinate may be recommended as the date/time for uploading the set of modifications 36 to the star catalog 34, as shown at block 272.

As shown at block 274, the date/time (e.g., the second time coordinate) to upload the set of modifications 36 to the star catalog 34 may be added to the modification schedule 68. In one example implementation, the date/time may be recommended prior to the vehicle 12 attaining the attitude where the minimum number of star entries 50*s* do not correspond to the plurality of tracked stars 90*a* (e.g., the first attitude 134*a*) and when date/time meets the modification constraints (e.g., when the set of modifications 36 will not change star entries 50*a* being used at that date/time). As one example, the modification schedule 68 may include a plurality of date/times for modifying the star catalog 34 based on the number of dry spots 38, the location of the dry spots 38 and/or the duration of the dry spots 38.

As the disclosed method 200 may be iterative, a new (e.g., refreshed) visualization 84 may be generated (block 244) after each iteration (e.g., of the steps and/or operations shown at blocks 202 and 204) in order to provide an updated visualization 84 of the occurrence of one or more dry spots 38 at the plurality of attitudes 134 of the vehicle 12 accounting for the modification star entries 86a modifying the star catalog 34.

As one example, the steps and/or operations of the disclosed method 200 may be repeated as many times as needed to obtain the minimum number of star entries 50a (e.g., the existing star entries 50a of the star catalog 34 and the modification star entries 86a modifying the star catalog 34) corresponding to the plurality of tracked stars 90 (e.g., the minimum number of identified stars 52a) required to properly estimate error and/or aid in maintaining an attitude estimate of the required accuracy of the vehicle 12.

Each modification star entry 86a (e.g., the star entry 50a selected from the main star database 88 based upon the steps and/or operations described herein above) may include the star data 82. The star data 82 may include a recorded value 66 of at least one metric 66 of the corresponding star 20a of the plurality of stars 20. As one example, the modification star entry 86a may include a plurality of metrics 70. The plurality of metrics 70 may include at least one of: a right ascension angle 72 of the star 62 in a given ECI coordinate frame 22, a declination angle 74 of the star 62 in the given ECI coordinate frame 22, a magnitude 76 of the star 62, a star vector 78, identification number 80 of the star 62 and/or other metrics 70 (e.g., properties) of the star 62. For example, the value 66 of the magnitude 76 may be the brightness value 100 of the star 62.

Figure 18:
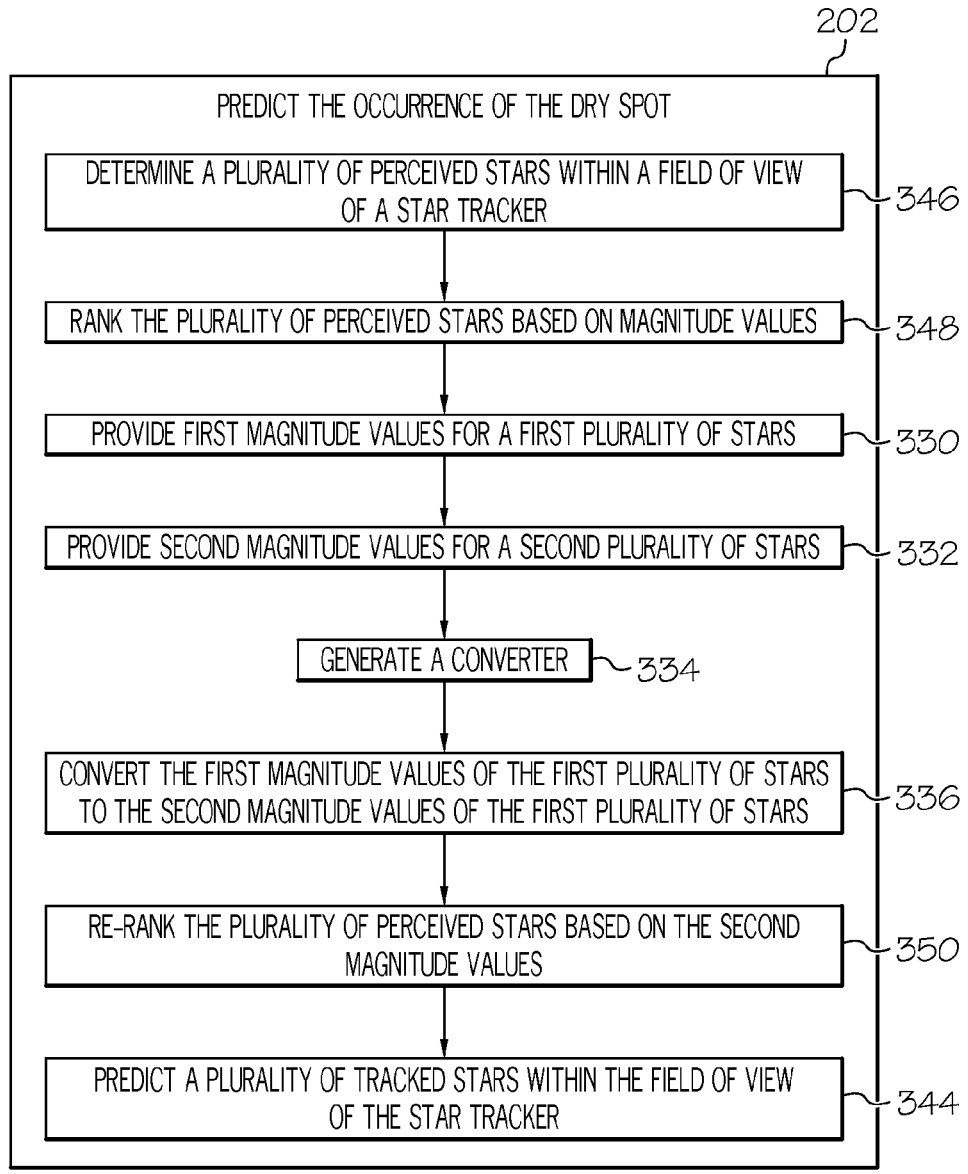
FIG. 18 is a flow diagram of one embodiment of the method for predicting the occurrence of the dry spot as represented in FIG. 1.

Referring to FIG. 18, in one embodiment predicting the occurrence of the dry spot 38 (block 202) may include predicting the tracked stars 90 within the field of view 42 of the star tracker 28 at the plurality of attitudes 130, as shown at block 344. Those skilled in the art will recognize that which star 20a the star tracker 28 locks onto and tracks (e.g., tracked star 90a) may depend upon the star magnitude 76 (e.g., brightness value 100) of the star 20a. As one example, the star tracker 28 may use the magnitude 76 of the star 20a to determine which stars 20a to track (e.g., which of the perceived stars 48a within the field of view 42 will be tracked stars 90a). Therefore, accurate and/or updated star magnitude estimates may be needed in order to predict the occurrence to the dry spot 38.

As one example, measured magnitudes from multiple different star trackers (e.g., star trackers made by different manufacturers) may be used to provide accurate star magnitude estimates. The additional star magnitude data may result in increased accuracy of dry spot prediction (e.g., date and/or duration determination) by aiding in the determination of which stars 20a the star tracker 28 is likely to track (e.g., the brightest stars). The occurrence of the dry spot 38 may depend on the star magnitude and/or the accuracy of the star magnitude data.

Those skilled in the art will recognize that there are vast amounts of star magnitude data is available (e.g., on the Internet, in astronomical databases, and based on satellite observations). However, different devices (e.g., different star trackers and/or vehicles) may provide different values for the recorded magnitudes. This may be true even for magnitude readings of the same star taken at the same time. Accordingly, the large amounts of magnitude data recorded by different types of star trackers may need to be adjusted for use with the star tracker of interest (e.g., measured magnitudes may need to be converted (e.g., mapped) to equivalent magnitudes for the star tracker 28).

Thus, the present disclosure recognizes and takes into account the benefit of being able to use magnitude data (e.g., values) for stars taken from many star trackers and/or many different types of star trackers.

As shown at block 346, a plurality of perceived stars 48 within the field of view 42 of the star tracker 28 may be determined. As shown at block 348, the plurality of perceived stars 48 within the field of view 42 may be ranked based on the magnitude value 66 of the star 20a.

As shown at block 330, first magnitude values of a first plurality of stars may be provided. The first magnitude values may include magnitude values of the first plurality of stars provided from (e.g., recorded by) the first star tracker. The first plurality of stars may include a large series (e.g., a large number) of stars. As one example, the first magnitude value may be a recorded magnitude value of a star taken (e.g., reported) by the first star tracker or a plurality of first star trackers.

As shown at block 332, second magnitude values of a second plurality of stars may be provided. The second magnitude values may include magnitude values of the second plurality of stars provided from (e.g., recorded by) a second star tracker (e.g., the star tracker 28). The second plurality of stars may be a sub-set of (e.g., included in) the first plurality of stars (e.g., a smaller series of stars). As one example, at least some of the stars in the first and second plurality of stars are the same. The second magnitude value may be an equivalent magnitude value if the magnitude value for the same star was taken by the second star tracker. As one example, the second star tracker may be the star tracker 28 and the first star tracker (or plurality of first star trackers) may be a type of star tracker than is different from the star tracker 28.

In one example implementation, star magnitude data may be recorded and/or gathered from a vehicle 12 (e.g., a spacecraft) using star tracker X (e.g., the second star tracker that is the same as the star tracker 28). Star magnitude data may be recorded and/or gathered from one or more vehicles 12 (e.g., a spacecraft) using star tracker Y (e.g., various different types of first star trackers). Star tracker X and star tracker Y may be different types of star trackers. A large amount of star magnitude data may result from recorded data taken from more than one star tracker Y.

The star magnitude data taken from both star tracker X and star tracker Y may be compared to find star magnitude for common stars (e.g., non-variable stars) or a common sets of stars. The common set of stars may be used to calculate a mapping function such that given a magnitude (e.g., value) for a star reported by star tracker Y, an equivalent magnitude that would be reported for the same star by star tracker X may be determined (e.g., converting the magnitude from star tracker Y to the magnitude for star tracker X).

As shown at block 334, a converter may be generated based on a relationship (e.g., a mathematical relationship) between the first magnitude values and the second magnitude values (e.g., mapping). As one example, the converter may be linear formula configured to convert the first magnitude value to the second magnitude value.

As shown at block 336, the first magnitude values of the first plurality of stars may be converted, by the converter, to the second magnitude values of the first plurality of stars.

As shown at block 350, the plurality of perceived stars 48 may be re-ranked based on the second magnitude values.

As shown at block 244, the plurality of tracked stars 90 (e.g., the plurality of perceived stars 48 within the field of view 42 of the star tracker 28 that will be tracked by the star tracker 28) may be predicted based on the re-ranked plurality of perceived stars 48 (e.g., based on the updated second magnitude values). Those skilled in the art will recognize that a star tracker will lock onto and track a predetermined number (e.g., a minimum number) of stars 20a within the field of view 42. Thus, an assumption may be made that the brightest stars 20a within the field of view 42 may define the predetermined number of tracked stars 90a. The brightest perceived stars 48a based on the second magnitude values may represent the predetermined number of tracked stars 90a.

As one example, if the star tracker 28 is designed to track eight stars, then the eight brightest stars within the field of view 42 at the corresponding attitude 130 are the stars most likely to be tracked. Thus, the top eight brightest perceived stars 48a based on the re-ranking of the perceived stars 48a may represent the tracked stars 90a.

In one example implementation, the steps and/or operations described above (e.g., blocks 346, 348, 330, 332, 334, 336, 350, and 344) may be used to determine the plurality of tracked stars 90 as described herein, for example at blocks 222, 230, 238, and 298.

Referring to FIG. 14, in one embodiment, generating the set of modifications 36 to modify the star catalog 34 (block 212) may include modifying one or more of the modification star entries 86a, as shown at block 326.

In one example implementation, modifying the star entry 86a (block 326) may include converting the first magnitude value taken from the first star tracker to the second magnitude value for the second star tracker. Converting the first magnitude value taken from the first star tracker to the second magnitude value for the second star tracker may be performed in a substantially similar manner as described herein above and shown at blocks 330, 332, 334, and 336.

The modification star entries 86a (e.g., the star data 82 of the modification star entries 86a) may be modified to include the second magnitude values for the corresponding stars for use by the star tracker 28.

Those skilled in the art will recognize that the steps and/or operations shown at blocks 326, 328, 330, 332, 334, and 336 may also be performed to modify the star entries 50a initially selected for inclusion in the star catalog 34 and used in connection with the star tracker 28.

In one example implementation, the star data 82 of the modification star entry 86a may be updated based upon one or more observed metrics 70a. As one example, the recorded value 66 of one or more metrics 70a of the star data 82 of the modification star entry 86a (e.g., the star entry 50a selected from the main star database 88) may not properly and/or accurately represent the actual value 66 of the metric 70a of the star 20a. As one example, the observed (e.g., actual) brightness value 100 (e.g., value 66) of the magnitude 76 (e.g., metric 70a) of the star 20a may be greater than or less than the recorded brightness value 100 of the star 20a. As one example, the magnitude of certain stars 20a may vary over time.

Thus, in order to determine whether the modification star entry 86a is a viable modification to the star catalog 34 (block 320 of FIG. 16), the recorded magnitude and the observed magnitude may be compared. As one example, the recorded magnitude may be changed to the observed magnitude if at least one of: a maximum brightness value of the observed magnitude is greater than a maximums brightness value of the recorded magnitude; or a minimum brightness value of the observed magnitude is less than a minimum brightness value of the recorded magnitude. As one example, a specific recorded magnitude (e.g., brightness value) may be set based on a range of observed magnitudes (e.g., the magnitude 76 may be chosen to be within a predetermined threshold or tolerance of all of the observed magnitudes for the star 20a during the period of time when the star 20a is tracked by the star tracker 28).

Thus, the steps and/or operations described above may ensure that the modification star entry 86a includes accurate star data 82 (e.g., accurate magnitude values) and the maximum known or estimated brightness value 100.

Referring to FIG. 10, in one example embodiment, uploading the set of modifications 36 to the star catalog 34 (block 216) may include storing at least one modification star entry 86a of the plurality of modification star entries 86 to the set of modifications 36; storing the set of modifications 36; and transmitting the set of modifications 36 to the star catalog 34. As one example, the set of modifications 36 may be transmitted to the star catalog 34 and stored in the memory 32 of the apparatus 18 of the vehicle 12 (e.g., uploaded to the vehicle 12), for example, at the date/time recommended by the modification schedule 68. As one example, the set of modifications 36 may be stored in remote memory (not shown), for example at the station 14 on the Earth 16, and transmitted to the vehicle 12 (e.g., uploaded to the vehicle 12), for example, at the date/time recommended by the modification schedule 68.

Although various embodiments of the disclosed system and method have been shown and described, modifications may occur to those skilled in the art upon reading the specification. The present application includes such modifications and is limited only by the scope of the claims.

What is claimed is:

1. A method implemented by a computing device for mitigating an occurrence of a dry spot, said method comprising:

predicting said occurrence of said dry spot at a plurality of attitudes, said dry spot occurring when a star tracker cannot identify a minimum number of tracked stars within a field of view because at least one of said minimum number of tracked stars does not have a corresponding star entry in a star catalog;

determining whether said dry spot will impact attitude determination performance based on whether said minimum number of tracked stars predicted to be within said field of view are identifiable by corresponding star entries in said star catalog at said plurality of attitudes; and modifying a said star catalog to reduce impact on said attitude determination performance due to said dry spot by including at least one modification star entry to said star catalog corresponding to said at least one of said minimum number of tracked stars that does not have said corresponding star entry in said star catalog.

2. The method of claim 1 further comprising generating a visualization of said occurrence of said dry spot.

3. The method of claim 2 wherein generating said visualization of said occurrence of said dry spot comprises:

generating a plot comprising a plurality of points of right ascensions and declinations to which a boresight of said star tracker points;

determining whether a plurality of tracked stars within said field of view of said star tracker corresponds to a minimum number of star entries in said star catalog at each point of said plurality of points;

coding said each point based upon a determination of whether said minimum number of star entries in said star catalog corresponds to said plurality of tracked stars;

generating a visual representation of said dry spot based upon said coding of said each point; and generating a visual representation of a trajectory of said boresight.

4. The method of claim 1 wherein predicting said occurrence of said dry spot comprises at least one of:
determining a location of said occurrence of said dry spot;
determining a date of said occurrence of said dry spot; and
determining a duration of said occurrence of said dry spot.

5. The method of claim 4 wherein determining said location of said occurrence of said dry spot comprises:
determining said plurality of attitudes of a vehicle;
providing said star catalog, said star catalog comprising a plurality of star entries;
determining a plurality of tracked stars within said field of view of said star tracker at said plurality of attitudes;
determining whether said plurality of tracked stars corresponds to a minimum number of star entries; and
determining said location of said occurrence of said dry spot based on said plurality of attitudes where said plurality of tracked stars does not correspond to said minimum number of star entries.

6. The method of claim 4 wherein determining said date of said occurrence of said dry spot comprises:
determining said plurality of attitudes of a vehicle;
providing said star catalog, said star catalog comprising a plurality of star entries;
determining a plurality of tracked stars within said field of view of said star tracker at said plurality of attitudes;
determining a first attitude of said plurality of attitudes where said plurality of tracked stars does not correspond to a minimum number of star entries; and
determining said date of occurrence of said dry spot based on a first time coordinate of said first attitude.

7. The method of claim 4 wherein determining said duration of said occurrence of said dry spot comprises:
determining said plurality of attitudes of a vehicle;
providing said star catalog, said star catalog comprising a plurality of star entries;
determining a plurality of tracked stars within said field of view of said star tracker at said plurality of attitudes;
determining a first attitude of said plurality of attitudes where said plurality of tracked stars does not correspond to a minimum number of star entries;
determining a second attitude of said plurality of attitudes where said plurality of tracked stars does correspond to said minimum number of star entries does, said second attitude occurring after said first attitude;
determining a time period between a first time coordinate of said first attitude and a second time coordinate of said second attitude; and
determining said duration of said occurrence of said dry spot based on said time period.

8. The method of claim 1 wherein modifying said star catalog comprises at least one of:
generating a set of modifications to modify said star catalog;
generating a modification schedule for modifying said star catalog; and
uploading said set of modifications to said star catalog.

9. The method of claim 8 wherein generating said set of modifications to modify said star catalog comprises:
determining said plurality of attitudes of a vehicle;
providing said star catalog, said star catalog comprising a plurality of star entries;
determining a plurality of tracked stars within said field of view of said star tracker at said plurality of attitudes;
determining whether said plurality of tracked stars corresponds to a minimum number of star entries;
determining a tracked star of said plurality of tracked stars that does not correspond to a star entry of said plurality of star entries;
determining a modification star entry corresponding to said tracked star;
determining whether said modification star entry can modify said star catalog; and
including said modification star entry to said set of modifications.

10. The method of claim 9 wherein determining whether said modification star entry can modify said star catalog comprises:
determining whether said modification star entry comprises an exclusionary property;
excluding said modification star entry when said modification star entry comprises said exclusionary property; and
recommending said modification star entry when said modification star entry does not comprise said exclusionary property.

11. The method of claim 9 wherein determining whether said modification star entry can modify said star catalog comprises:
determining whether at least one star entry of said plurality of star entries is replaceable;
determining whether said modification star entry is a viable modification to said star catalog; and
recommending said modification star entry when said star entry is replaceable and is said viable modification.

12. The method of claim 8 wherein generating said modification schedule for modifying said star catalog comprises:
determining a first time coordinate where a plurality of tracked stars does not correspond to a minimum number of star entries;
determining a second time coordinate prior to said first time coordinate;
determining whether said second time coordinate meets modification constraints; and
recommending said second time coordinate as a date/time to upload said set of modifications to said star catalog when said second time coordinate meets said modification constraints.

13. The method of claim 1 wherein predicting said occurrence of said dry spot further comprises:
providing first magnitude values of a first plurality of stars;
providing second magnitude values of a second plurality of stars, said second plurality of stars being a sub-set of said first plurality of stars;
converting said first magnitude values of said first plurality of stars to said second magnitude values of said first plurality of stars; and
predicting a plurality of tracked stars within said field of view of said star tracker based on said second magnitude values.

14. The method of claim 1 wherein at least one of predicting said occurrence of said dry spot and modifying said star catalog comprises providing said plurality of attitudes of a vehicle, wherein providing said plurality of attitudes comprises:
providing first attitude data comprising a plurality of first time coordinates and an associated plurality of first attitudes;
providing a regular time duration; and
generating second attitude data comprising a plurality of second time coordinates and an associate plurality of second attitudes, said plurality of second time coordinates being spaced apart by said regular time duration.

15. A system for mitigating an occurrence of a dry spot, said system comprising:
at least one computing device; and
a non-transitory medium storing instructions that, when executed by said at least one computing device, causes said at least one computing device to:
predict said occurrence of said dry spot at a plurality of attitudes, said dry spot occurring when a star tracker cannot identify a minimum number of tracked stars within a field of view because at least one of said minimum number of tracked stars does not have a corresponding star entry in a star catalog;
determine whether said dry spot will impact attitude determination performance based on whether said minimum number of tracked stars predicted to be within said field of view are identifiable by corresponding star entries in said star catalog at said plurality of attitudes; and
modify said star catalog to reduce an impact of said dry spot by including at least one modification star entry to said star catalog corresponding to said at least one of said minimum number of tracked stars that does not have said corresponding star entry in said star catalog.

16. The system of claim 15 wherein said instructions, when executed by said at least one computing device, further cause said at least one computing device to:
generate a plot comprising a plurality of points of right ascensions and declinations to which a boresight of said star tracker points;
determine whether a plurality of tracked stars within said field of view of said star tracker corresponds to a minimum number of star entries in said star catalog at each point of said plurality of points;
code said each point based upon a determination of whether said minimum number of star entries in said star catalog corresponds to said plurality of tracked stars;
generate a visual representation of said dry spot based upon said coding of said each point; and
generate a visual representation of a trajectory of said boresight.

17. The system of claim 15 wherein said instructions, when executed by said at least one computing device, further cause said at least one computing device to determine at least one of:
a location of said occurrence of said dry spot;
a date of said occurrence of said dry spot; and
a duration of said occurrence of said dry spot.

18. The system of claim 15 wherein said instructions, when executed by said at least one computing device, further cause said at least one computing device to:
generate a set of modifications to modify said star catalog;
generate a modification schedule for modifying said star catalog; and
upload said set of modifications to said star catalog.

19. The system of claim 15 wherein said instructions, when executed by said at least one computing device, further cause said at least one computing device to:
determine said plurality of attitudes of a vehicle;
determine a plurality of tracked stars within said field of view of said star tracker at said plurality of attitudes;
determine whether said plurality of tracked stars corresponds to a minimum number of star entries;
determine a tracked star of said plurality of tracked stars that does not correspond to a star entry of said plurality of star entries;
determine a modification star entry corresponding to said tracked star;
determine whether said modification star entry can modify said star catalog; and
include said modification star entry to said set of modifications.

20. The system of claim 19 wherein said instructions, when executed by said at least one computing device, further cause said at least one computing device to:
determine whether said modification star entry comprises an exclusionary property;
determine whether at least one star entry of said plurality of star entries is replaceable;
determine whether said modification star entry is a viable modification to said star catalog; and
recommend said modification star entry when said modification star entry does not comprise said exclusionary property, said star entry is replaceable, and said modification star entry is said viable modification.

21. The system of claim 15 wherein said instructions, when executed by said at least one computing device, further cause said at least one computing device to:
determine said plurality of attitudes of a vehicle;
determine a plurality of tracked stars within said field of view of said star tracker at said plurality of attitudes;
determine a first attitude of said plurality of attitudes where said plurality of tracked stars does not correspond to a minimum number of star entries;
determine a second attitude of said plurality of attitudes where said plurality of tracked stars does correspond to said minimum number of star entries, said second attitude occurring after said first attitude;
determine a location of said occurrence of said dry spot based on said plurality of attitudes where said minimum number of star entries does not correspond to said plurality of tracked stars;
determine a date of occurrence of said dry spot based on a first time coordinate of said first attitude; and
determine a duration of said occurrence of said dry spot based on a time period between a first time coordinate of said first attitude and a second time coordinate of said second attitude.

22. The system of claim 15 wherein said instructions, when executed by said at least one computing device, further cause said at least one computing device to:
determine a first time coordinate where a plurality of tracked stars does not correspond to a minimum number of star entries;
determine a second time coordinate prior to said first time coordinate;
determine whether said second time coordinate meets modification constraints; and
recommend said second time coordinate as a date/time to upload said set of modifications to said star catalog when said second time coordinate meets said modification constraints.

23. The system of claim 15 further comprising:
first magnitude values of a first plurality of stars; and
second magnitude values of a second plurality of stars, said second plurality of stars being a sub-set of said first plurality of stars,
wherein said instructions, when executed by said at least one computing device, further cause said at least one computing device to:

convert said first magnitude values of said first plurality of stars to said second magnitude values of said first plurality of stars; and predict a plurality of tracked stars within a field of view of a star tracker based on said second magnitude values.

24. The system of claim 15 further comprising:

first attitude data comprising a plurality of first time coordinates and an associated plurality of first attitudes; and a regular time duration, wherein said instructions, when executed by said at least one computing device, further cause said at least one computing device to:

generate second attitude data comprising a plurality of second time coordinates and an associate plurality of second attitudes, said plurality of second time coordinates being spaced apart by said regular time duration.

* * * * *